US010116918B2

(12) United States Patent
Nagata et al.

(10) Patent No.: US 10,116,918 B2
(45) Date of Patent: Oct. 30, 2018

(54) DISPARITY IMAGE GENERATING DEVICE, DISPARITY IMAGE GENERATING METHOD, AND IMAGE

(71) Applicant: TOYOTA JIDOSHA KABUSHIKI KAISHA, Toyota-shi, Aichi (JP)

(72) Inventors: Akihiko Nagata, Mishima (JP); Toshiyuki Matsubara, Gotenba (JP); Kiyosumi Kidono, Nagakute (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 72 days.

(21) Appl. No.: 15/316,556

(22) PCT Filed: May 26, 2015

(86) PCT No.: PCT/JP2015/065705
§ 371 (c)(1),
(2) Date: Dec. 6, 2016

(87) PCT Pub. No.: WO2015/190327
PCT Pub. Date: Dec. 17, 2015

(65) Prior Publication Data
US 2017/0163960 A1   Jun. 8, 2017

(30) Foreign Application Priority Data
Jun. 12, 2014   (JP) .................. 2014-121668

(51) Int. Cl.
*H04N 13/128*   (2018.01)
*H04N 13/271*   (2018.01)
*G06T 7/593*   (2017.01)

(52) U.S. Cl.
CPC .......... *H04N 13/128* (2018.05); *G06T 7/593* (2017.01); *H04N 13/271* (2018.05);
(Continued)

(58) Field of Classification Search
None
See application file for complete search history.

(56) References Cited

U.S. PATENT DOCUMENTS 6,606,406 B1    8/2003   Zhang et al.
2012/0050496 A1  3/2012   Nishigaki
(Continued)

FOREIGN PATENT DOCUMENTS

WO    2010/028718 A2    3/2010

OTHER PUBLICATIONS

Heiko Hirschmüller. "Accurate and Efficient Stereo Processing by Semi-Global Matching and Mutual Information". IEEE Conference on Computer Vision and Pattern Recognition (CVPR), pp. 807-814.
(Continued)

*Primary Examiner* — Hung Q Dang
(74) *Attorney, Agent, or Firm* — Oliff PLC

(57) ABSTRACT

A disparity image generating device includes: a disparity image acquiring unit configured to acquire chronologically consecutive first and second disparity images based on an imaging result of an environment around a vehicle; a first correcting unit configured to optimize a disparity value of a first target pixel from among pixels configuring the first disparity image; a second correcting unit configured to optimize a disparity value of a second target pixel from among pixels configuring the second disparity image; and a disparity image generating unit configured to calculate a desired disparity image, based on a comparison between the first disparity image optimized by the first correcting unit and the second disparity image optimized by the second correcting unit.

19 Claims, 15 Drawing Sheets

(52) U.S. Cl.
CPC ............... *G06T 2207/10012* (2013.01); *G06T 2207/10028* (2013.01); *G06T 2207/20072* (2013.01)

(56) References Cited

U.S. PATENT DOCUMENTS

2013/0050187 A1* 2/2013 Korcsok ............ H04N 13/0011
345/419
2014/0063199 A1 3/2014 Kim

OTHER PUBLICATIONS

Saneyoshi Keiji. "Recent Trends of Real-Time Stereo Vision for Automobile and Application to Pedestrian Detection". (TOPICS Multi-Disciplinary Approach for the Improvement of Traffic Safety), Journal of Society of Automotive Engineers of Japan, vol. 67, No. 12, pp. 84-89.

Christian Scharfenberger et al. "Motion Stereo-Based Collision Avoidance for an Intelligent Smart Car Door System". Intelligent Transportation Systems (ITSC), 2012 15th International IEEE Conference On, IEEE, pp. 1383-1389, XP032264053.

Julius Ziegler et al. "Making Bertha Drive? An Autonomous Journey on a Historic Route". IEEE Intelligent Transportation Systems Magazine, IEEE, USA, vol. 6, No. 2, pp. 8-20.

\* cited by examiner (a)

SHIFTED DISPARITY IMAGE D'(t-1) AT
TIME t-1

(b)

DISPARITY IMAGE D(t) AT TIME t

DISPARITY IMAGE GENERATING DEVICE, DISPARITY IMAGE GENERATING METHOD, AND IMAGE

TECHNICAL FIELD

The present invention relates to a disparity image generating device, a disparity image generating method, and an image.

BACKGROUND ART

In the past, when a dense disparity image is generated, an algorithm (a semi-global matching (SGM) technique) of searching for corresponding (matching) points between two images, generating a disparity image, and then optimizing a disparity value in view of smoothness with neighboring disparities (in 8 to 16 directions) has been used.

For example, the following technique is used in a dense disparity image generating technique disclosed in Patent Literature 1. A brightness image L and a brightness image R are acquired from left and right cameras of a stereo camera. A disparity image D(1) based on the brightness image L is generated based on both the acquired brightness image L and the brightness image R, and a disparity image D'(1') based on the brightness image R is generated based on both the brightness image L and the brightness image R. An image C(1) (and an image S(1)) is generated by correcting disparity values of pixels configuring the generated disparity image D(1) based on disparity values of some pixels in (i) a left pixel route, (ii) an upper-left oblique pixel route, (iii) an upper pixel route, and (iv) an upper-right oblique pixel route with respect to the same pixel (hereinafter, referred to as a "correction process A"). An image C'(1') (and an image S'(1')) is generated by correcting disparity values of pixels configuring the generated disparity image D'(1') based on disparity values of some pixels in (v) a right pixel route, (vi) a lower-right oblique pixel route, (vii) a lower pixel route, and (viii) a lower-left oblique pixel route with respect to the same pixel (hereinafter, referred to as a "correction process B"). A desired disparity image is calculated by comparing pixel values configuring the generated image C1 (S (1)) and the image C'(1') (S'(1')).

Further, Non-Patent Literature 1 discloses a dense disparity image calculating technique based on an SGM technique that is an in-vehicle high-functioning stereo camera technique as a basic technique of the technique disclosed in Patent Literature 1. In the technique disclosed in Non-Patent Literature 1, a disparity image D is acquired by a stereo camera, and a desired disparity image is calculated by correcting disparity values of pixels configuring the disparity image D based on disparity values of some pixels in pixel routes in at least eight directions with respect to the same pixel. Furthermore, Non-Patent Literature 2 discloses the SGM technique as well.

CITATION LIST

Patent Literature

Patent Literature 1: WO 2010/028718 A

Non-Patent Literatures

Non-Patent Literature 1: Heiko Hirschmuller, "Accurate and Efficient Stereo Processing by Semi-Global Matching and Mutual Information," IEEE Conference on Computer Vision and Pattern Recognition (CVPR), San Diego, Calif., USA, Jun. 20-26, 2005.

Non-Patent Literature 2: Saneyoshi Keiji, "Recent Trends of Real-time Stereo Vision for Automobile and Application to Pedestrian Detection" (TOPICS Multi-Disciplinary Approach for the Improvement of Traffic Safety), Journal of Society of Automotive Engineers of Japan, Vol. 67, No. 12, 2013.

DISCLOSURE OF INVENTION

Problems to be Solved by the Invention

Meanwhile, a huge calculation amount is commonly necessary to generate a dense disparity image. For example, in the dense disparity image generating technique (the SGM technique disclosed in Patent Literature 1) according to the related art, subsequent image processing is performed using both the disparity image based on the brightness image L and the disparity image based on the brightness image R, and thus it takes a processing cost. The reason is described below with reference to FIG. 1. FIG. 1 is a diagram illustrating an overview of an optimization process in a dense disparity image generating technique according to a related art.

As illustrated in FIG. 1, in a process (SGM technique) of optimizing a disparity value of a point of interest in view of smoothness with a neighboring disparity, information (hereinafter, referred to as "interim information") obtained by performing raster scanning on a disparity image (a left diagram in FIG. 1) based on a brightness image L from the upper left to the lower right and considering smoothness with disparities at the left of and above the point of interest is held in a memory. Then, information obtained by performing raster scanning on a disparity image (a right diagram in FIG. 1) based on a brightness image R from the lower right to the upper left and considering smoothness with disparities at the right of and below the point of interest and the interim information held in the memory are collated to decide optimal disparity values. Then, the decided optimal disparity values are merged to calculate a desired disparity image (a lower diagram in FIG. 1). Here, in the optimization process of the related art, since two-direction raster scan has to be performed, a processing amount is large. Here, the two-direction raster scan indicates a raster scan performed from an upper line to a lower line starting from an upper left pixel in the disparity image illustrated in the left diagram in FIG. 1 and a raster scan performed from a lower line to an upper line starting from a lower right pixel in the disparity image illustrated in the right diagram in FIG. 1, for example. Further, since it is necessary to prepare a memory for holding the interim information, it is difficult to mount it in an in-vehicle microcomputer.

In this regard, in order to reduce a calculation amount and thus reduce a processing cost, the optimization process is considered to be performed by one-direction raster scan (for example, only the raster scan performed from an upper line to a lower line starting from an upper left pixel in the disparity image illustrated in the left diagram in FIG. 1), but in this case, the accuracy of generating the dense disparity image is lowered. The reason is described below with reference to FIG. 2. FIG. 2 is a diagram illustrating exemplary disparity values calculated when the optimization process is performed by the one-direction raster scan.

As illustrated in FIG. 2, when the optimization process is performed by the one-direction raster scan, for example, in the case of a target region in a disparity image of a traffic environment, a disparity of a point on a road surface (horizontal surface) having a low contrast due to a shadow or the like is low in a matching cost (reliability). Thus, a contribution degree of a neighboring disparity that is high in a matching cost, for example, a disparity of a point on a road surface (horizontal surface) having a high contrast due to a sunny spot or the like is high. As a result, unlike an optimal solution (a lattice 2) when scanning is performed in two directions, erroneous optimal solutions (a lattice 1 and a lattice 3) are derived when scanning is performed in one direction.

Specifically, when two-direction scanning is originally performed, since the optimizing is performed in eight left, right, top and bottom directions, disparity values are 2, 3, 4, 5, 6, 7, and 8 from the top (lattice 2). However, when one-direction scanning is performed, for example, when scanning is performed from the upper left to the lower right (lattice 1), since the optimizing is performed in only four upper and left directions, a disparity (a second disparity value 3 from the top in the lattice 1) of a sunny spot is propagated, and thus disparities (third to fifth parities from the top in the lattice 1) of points corresponding to a shadow have the same disparity value (a disparity value 3 in the lattice 1) as a point having a high contribution degree and corresponding to a sunny spot. In this case, the disparity values are 2, 3, 3, 3, 3, 7, and 8 from the top. Similarly, for example, when the scanning is performed from the lower right to the upper left (the lattice 3), since the optimizing is performed in only four lower and right directions, a disparity (a second disparity value 7 from the bottom in the lattice 2) of a sunny spot is propagated, and thus disparities (third to fifth parities from the bottom in the lattice 3) of points corresponding to a shadow have the same disparity value (a disparity value 7 in the lattice 3) as a point having a high contribution degree and corresponding to a sunny spot. In this case, the disparity values are 2, 3, 7, 7, 7, 7, and 8 from the top.

The present invention was made in light of the foregoing, and it is an object of the present invention to provide a disparity image generating device and a disparity image generating method, which are capable of generating a dense disparity image with a high degree of accuracy while suppressing a processing cost in a technique of generating a dense disparity image.

Solutions to the Problems

A disparity image generating device according to the present invention includes a disparity image acquiring means configured to acquire a disparity image based on an imaging result of an environment around a vehicle; a first correcting means configured to optimize disparity values of pixels configuring the disparity image, based on disparity values of pixels configuring at least a part of a first pixel route which is a certain pixel route in at least one direction with respect to a same pixel; a second correcting means configured to optimize the disparity values of the pixels configuring the disparity image, based on disparity values of pixels configuring at least a part of a second pixel route, which is a certain pixel route in at least one direction with respect to a same pixel and a pixel route different from the first pixel route; and a disparity image generating means configured to apply an optimizing by the first correcting means to a first disparity image acquired by the disparity image acquiring means at a first time, apply an optimizing by the second correcting means to a second disparity image acquired by the disparity image acquiring means at a second time which is a time after the first time, and calculate to generate a desired disparity image, based on a comparison between the first disparity image optimized by the first correcting means and the second disparity image optimized by the second correcting means.

Further, in the disparity image generating device, it is preferable that the disparity image generating device further includes a vehicle information acquiring means configured to acquire movement information of the vehicle; and an associating means configured to associate a certain pixel position configuring the first disparity image with a certain pixel position configuring the second disparity image so that the certain pixel positions become a same imaging position, based on movement information from the first time to the second time acquired by the vehicle information acquiring means. Here, the disparity image generating means compares the first disparity image optimized by the first correcting means with the second disparity image optimized by the second correcting means for each pixel between pixels associated by the associating means, to calculate the desired disparity image.

Further, in the disparity image generating device, it is preferable that at the time the desired disparity image is calculated to generate, by comparing a difference between the disparity value of the first disparity image optimized by the first correcting means and the disparity value of the second disparity image optimized by the second correcting means for each pixel, the disparity image generating means suppresses a disparity value of the same pixel in the second disparity image from being used as a disparity value of the desired disparity image, at the time the difference between the disparity values is greater than or equal to a certain determination threshold value, and the disparity image generating means promotes the disparity value of the same pixel in the second disparity image to be used as the disparity value of the desired disparity image, at the time the difference between the disparity values is smaller than the determination threshold value.

Further, in the disparity image generating device, it is preferable that the disparity image generating means does not use the disparity value of the same pixel in the second disparity image as the disparity value of the desired disparity image, at the time the difference between the disparity values is greater than or equal to the determination threshold value, and the disparity image generating means uses the disparity value of the same pixel in the second disparity image as the disparity value of the desired disparity image, at the time the difference between the disparity values is smaller than the determination threshold value.

Further, in the disparity image generating device, it is preferable that the disparity image generating means sets the disparity value of the same pixel in the second disparity image to the desired disparity image as a disparity value with low reliability, at the time the difference between the disparity values is greater than or equal to the determination threshold value, and the disparity image generating means sets the disparity value of the same pixel in the second disparity image to the desired disparity image as a disparity value with high reliability, at the time the difference between the disparity values is smaller than the determination threshold value.

Further, in the disparity image generating device, it is preferable that the certain determination threshold value is a determination threshold value decided according to a disparity value with reference to a map specified such that a threshold value increases as a disparity value increases, or a determination threshold value set as a fixed value in advance.

A disparity image generating method according to the present invention includes a disparity image acquiring step of acquiring a disparity image based on an imaging result of an environment around a vehicle; a first correcting step of optimizing disparity values of pixels configuring the disparity image acquired in the disparity image acquiring step, based on disparity values of pixels configuring at least a part of a first pixel route which is a certain pixel route in at least one direction with respect to a same pixel; a second correcting step of optimizing the disparity values of the pixels configuring the disparity image acquired in the disparity image acquiring step, based on disparity values of pixels configuring at least a part of a second pixel route, which is a certain pixel route in at least one direction with respect to a same pixel and a pixel route different from the first pixel route; and a disparity image generating step of applying an optimizing by the first correcting step to a first disparity image acquired in the disparity image acquiring step at a first time, applying an optimizing by the second correcting step to a second disparity image acquired in the disparity image acquiring step at a second time which is a time after the first time, and calculating to generate a desired disparity image, based on a comparison between the first disparity image optimized in the first correcting step and the second disparity image optimized in the second correcting step.

Further, in the disparity image generating method, it is preferable that the disparity image generating method further includes a vehicle information acquiring step of acquiring movement information of the vehicle; and an associating step of associating a certain pixel position configuring the first disparity image with a certain pixel position configuring the second disparity image so that the certain pixel positions become a same imaging position, based on movement information from the first time to the second time acquired in the vehicle information acquiring step. Here, the disparity image generating step includes comparing the first disparity image optimized in the first correcting step with the second disparity image optimized in the second correcting step for each pixel between pixels associated in the associating step, to calculate the desired disparity image.

Further, in the disparity image generating method, it is preferable that at the time the desired disparity image is calculated to generate, by comparing a difference between the disparity value of the first disparity image optimized in the first correcting step and the disparity value of the second disparity image optimized in the second correcting step for each pixel, the disparity image generating step includes suppressing a disparity value of the same pixel in the second disparity image from being used as a disparity value of the desired disparity image, at the time the difference between the disparity values is greater than or equal to a certain determination threshold value, and the disparity image generating step includes promoting the disparity value of the same pixel in the second disparity image to be used as the disparity value of the desired disparity image, at the time the difference between the disparity values is smaller than the determination threshold value.

An image according to the present invention generated by a disparity image generating method according to the present invention. Here, the disparity image generating method includes a disparity image acquiring step of acquiring a disparity image based on an imaging result of an environment around a vehicle, a first correcting step of optimizing disparity values of pixels configuring the disparity image acquired in the disparity image acquiring step, based on disparity values of pixels configuring at least a part of a first pixel route which is a certain pixel route in at least one direction with respect to a same pixel, a second correcting step of optimizing the disparity values of the pixels configuring the disparity image acquired in the disparity image acquiring step based on disparity values of pixels configuring at least a part of a second pixel route, which is a certain pixel route in at least one direction with respect to a same pixel and a pixel route different from the first pixel route, and a disparity image generating step of applying an optimizing by the first correcting step to a first disparity image acquired in the disparity image acquiring step at a first time, applying an optimizing by the second correcting step to a second disparity image acquired in the disparity image acquiring step at a second time which is a time after the first time, and calculating to generate a desired disparity image, based on a comparison between the first disparity image optimized in the first correcting step and the second disparity image optimized in the second correcting step. Here, the image is configured with only pixels having disparity values of the second disparity image in which a difference between a disparity value of the first disparity image optimized in the first correcting step and a disparity value of the second disparity image optimized in the second correcting step is determined to be smaller than a determination threshold value in the disparity image generating step.

Effects of the Invention

A disparity image generating device and a disparity image generating method according to the present invention can switch a scanning direction of an optimization process in units of frames for chronologically consecutive disparity images in a technique of generating a dense disparity image. Thus, according to the disparity image generating device and the disparity image generating method of the present invention, an effect of generating a dense disparity image with a high degree of accuracy while reducing a processing cost is obtained.

DESCRIPTION OF EMBODIMENTS

Hereinafter, exemplary embodiments of a disparity image generating device and a disparity image generating method according to the present invention will be described in detail with reference to the appended drawings. Further, the invention is not limited to the following embodiments. Further, components in the following embodiments include components that can be easily conceived by a person skilled in the art or substantially the same components.

Embodiment

Figure 3:
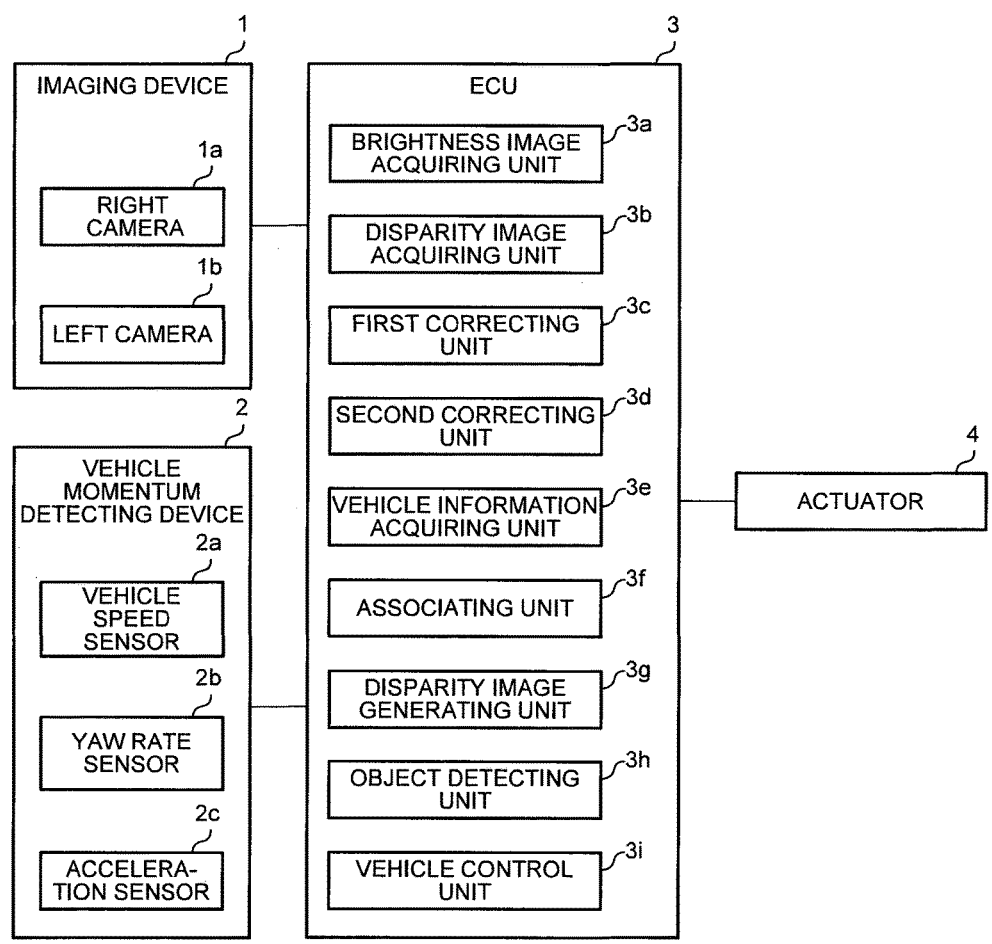
FIG. 3 is a diagram illustrating a configuration of a disparity image generating device according to the present invention.
Figure 10:
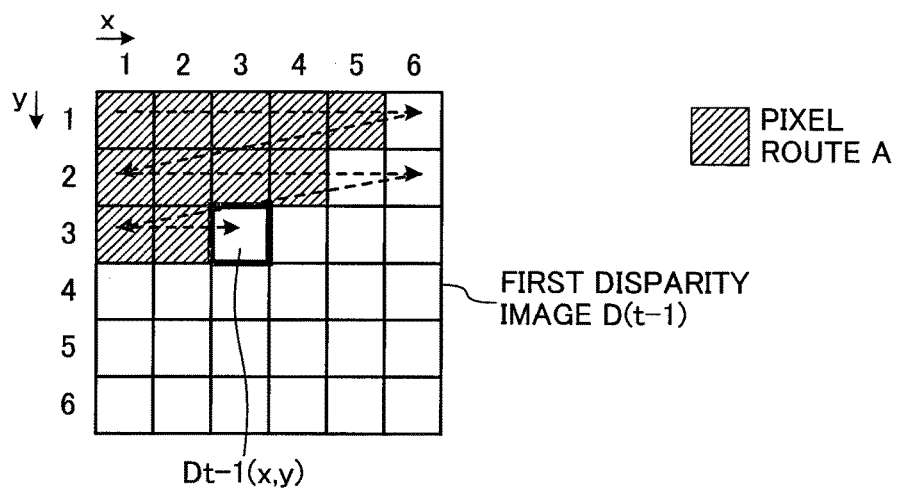
FIG. 10 is a diagram illustrating an exemplary disparity optimization process according to the present embodiment.
Figure 11:
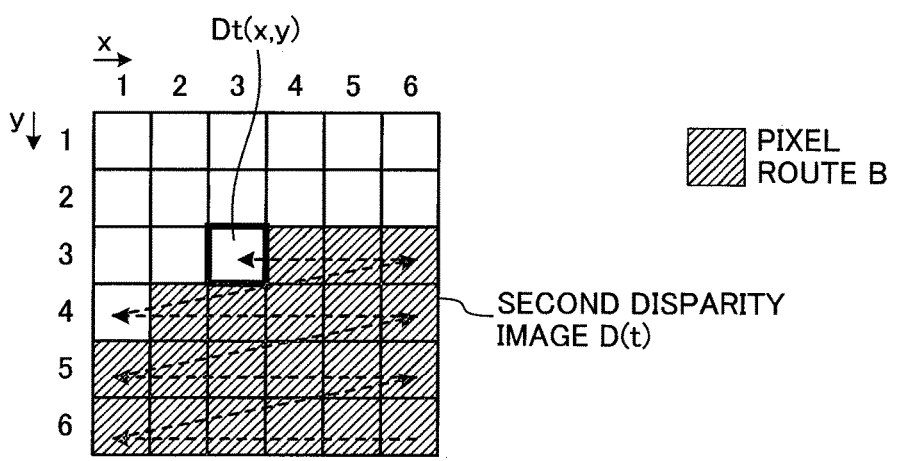
FIG. 11 is a diagram illustrating an exemplary disparity optimization process according to the present embodiment.
Figure 12:
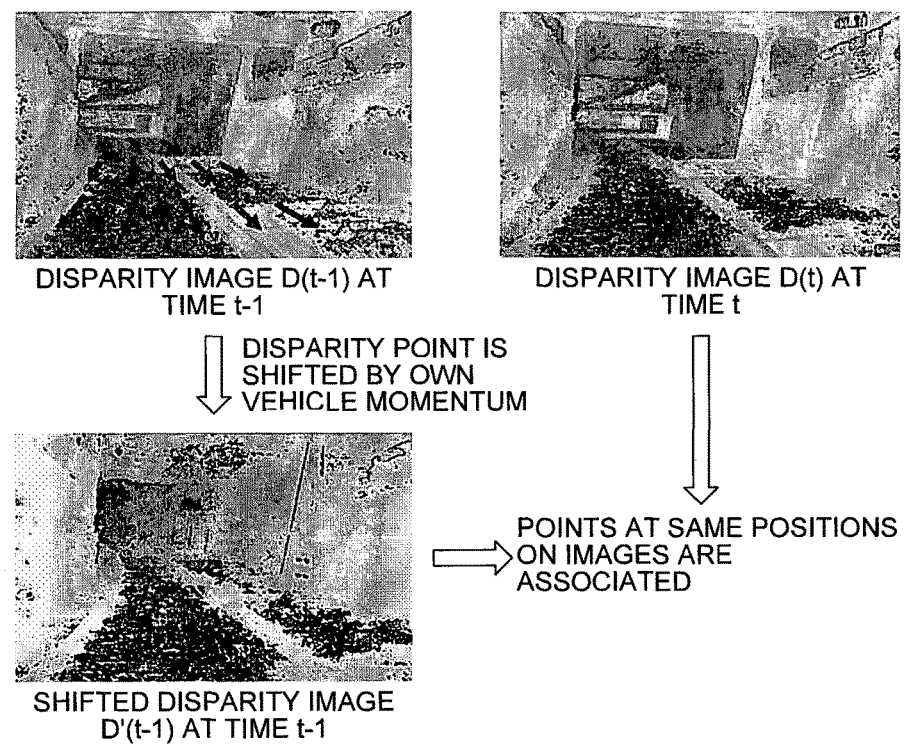
FIG. 12 is a diagram illustrating an exemplary association process according to the present embodiment.
Figure 13:
FIGS. 13(a) and 13(b) are diagrams illustrating an exemplary disparity image comparison process according to the present embodiment.
Figure 13:
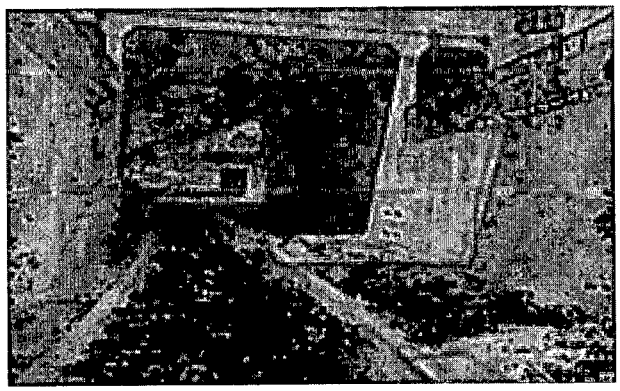
Figure 14:
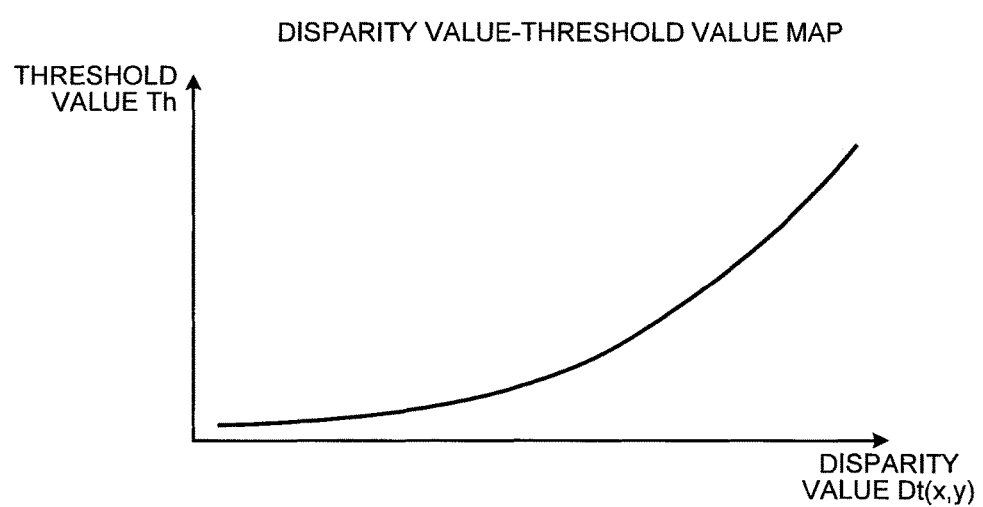
FIG. 14 is a diagram illustrating an exemplary determination threshold value according to the present embodiment.
Figure 15:
FIGS. 15(a) to 15(d) are diagrams illustrating an exemplary image generated according to the present embodiment.
Figure 15:
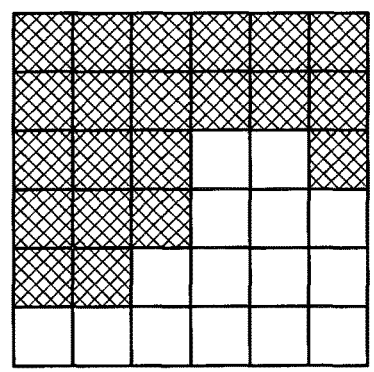

A configuration of a disparity image generating device according to the present invention will be described with reference to FIGS. 3 to 15. Here, FIG. 3 is a diagram illustrating a configuration of the disparity image generating device according to the present invention. FIGS. 4 to 11 are diagrams illustrating an exemplary disparity optimization process according to the present embodiment. FIG. 12 is a diagram illustrating an exemplary association process according to the present embodiment. FIGS. 13(a) and 13(b) are diagrams illustrating an exemplary disparity image comparison process according to the present embodiment. FIG. 14 is a diagram illustrating an exemplary determination threshold value according to the present embodiment. FIGS. 15(a) to 15(d) are diagrams illustrating an exemplary image generated according to the present embodiment.

The disparity image generating device according to the present embodiment is mounted in a vehicle (its own vehicle), and typically includes an imaging device 1, a vehicle momentum detecting device 2, an ECU 3, and an actuator 4.

The imaging device 1 is an imaging means that images a traffic environment in a traveling direction of the vehicle. The imaging device 1 is configured with a right camera 1a and a left camera 1b having an imaging function. The right camera 1a is installed at a front right side of the vehicle, and the left camera 1b is installed at a front left side of the vehicle. The right camera 1a and the left camera 1b are, for example, a stereo camera. The right camera 1a outputs a brightness image R that is an image obtained by imaging the traveling direction of the vehicle to the ECU 3. The left camera 1b outputs a brightness image L that is an image obtained by imaging the traveling direction of the vehicle to the ECU 3.

The vehicle momentum detecting device 2 is an own vehicle momentum detecting means that detects various kinds of information (a vehicle speed, a yaw rate, acceleration, and the like) indicating vehicle momentum. The vehicle momentum detecting device 2 is configured to include at least a vehicle speed sensor 2a, a yaw rate sensor 2b, and an acceleration sensor 2c. The vehicle speed sensor 2a is installed in each wheel and is a wheel speed detecting device that detects each wheel speed. Each vehicle speed sensor 2a detects a wheel speed that is a rotational speed of each wheel. Each vehicle speed sensor 2a outputs a wheel speed signal indicating a detected wheel speed of each wheel to the ECU 3. The ECU 3 calculates a vehicle speed that is a traveling speed of the vehicle based on a wheel speed of each wheel input from each vehicle speed sensor 2a. The ECU 3 may calculate a vehicle speed based on a wheel speed input from at least one of the vehicle speed sensors 2a. The ECU 3 acquires the calculated vehicle speed as the movement information of the vehicle. The yaw rate sensor 2b is a yaw rate detecting device that detects a yaw rate of the vehicle. The yaw rate sensor 2b outputs a yaw rate signal indicating the detected yaw rate to the ECU 3. The ECU 3 acquires the input yaw rate signal as the movement information of the vehicle. The acceleration sensor 2c is an acceleration detecting device that detects acceleration applied to a vehicle body. The acceleration sensor 2c outputs an acceleration signal indicating the detected acceleration to the ECU 3. The ECU 3 acquires the input acceleration signal as the movement information of the vehicle.

The ECU 3 is an electronic control unit that controls driving of components of the vehicle, and has a known microcomputer including a CPU, ROM, RAM, and an interface as a main entity. The ECU 3 is electrically connected with the imaging device 1 and the vehicle momentum detecting device 2, and receives an electrical signal corresponding to a detection result. Further, the ECU 3 performs various kinds of calculation processes according to an electrical signal corresponding to a detection result, and outputs a control command corresponding to a calculation result to control an operation of the actuator 4 electrically connected with the ECU 3. For example, the ECU 3 performs driving support control of controlling behavior of the vehicle by outputting a control signal based on the calculation process result to the actuator 4 and operating the actuator 4.

The details of various kinds of processing units of the ECU 3 will be described. The ECU 3 includes at least a brightness image acquiring unit 3a, a disparity image acquiring unit 3b, a first correcting unit 3c, a second correcting unit 3d, a vehicle information acquiring unit 3e, an associating unit 3f, a disparity image generating unit 3g, an object detecting unit 3h, and a vehicle control unit 3i.

In the ECU 3, the brightness image acquiring unit 3a is a brightness image acquiring means that acquires the brightness image R and the brightness image L output from the right camera 1a and the left camera 1b of the imaging device 1. The brightness image acquiring unit 3a further has a function of correcting the brightness image R and the brightness image L so that there is no lens distortion of the right camera 1a and the left camera 1b and correcting the brightness image R and the brightness image L so that optical axes of the right camera 1a and the left camera 1b are parallel as an image distortion correction process. The brightness image R and the brightness image L that have been acquired and subjected to distortion correction by the brightness image acquiring unit 3a are used for processing of the disparity image acquiring unit 3b.

The disparity image acquiring unit 3b is a disparity image acquiring means that acquires a disparity image based on an imaging result of an environment around the vehicle. The disparity image acquiring unit 3b acquires the disparity image D based on the brightness image R and the brightness image L that have been acquired and subjected to distortion correction by the brightness image acquiring unit 3a. In the present embodiment, the disparity image acquiring unit 3b acquires the disparity image D based on any one of the brightness image L and the brightness image R. In other words, the disparity image acquiring unit 3b acquires the disparity image D(1) based on the brightness image L using both the brightness image L and the brightness image R or acquires the disparity image D'(1') based on the brightness image R using both the brightness image L and the brightness image R. The disparity image D (that is, either the disparity image D(1) or the disparity image D'(1')) acquired by the disparity image acquiring unit 3b is used for processing of the first correcting unit 3c and the second correcting unit 3d.

For example, an example of acquiring the disparity image D(1) based on the brightness image L using both the brightness image L and the brightness image R as the disparity image D used for subsequent processing will be described below. First, the disparity image acquiring unit 3b searches for corresponding pixels between the brightness image L and the brightness image R. Then, the disparity image acquiring unit 3b calculates a disparity value D(x,y) and reliability R(x,y) for each of the searched corresponding pixels. Further, the disparity image acquiring unit 3b performs a process of associating the calculated disparity value D(x,y) with the reliability R(x,y) for each position information (x,y) of the pixel. Further, in the present embodiment, a pixel may be a group of a plurality of pixels as well as a single pixel.

Specifically, in the case of calculating the disparity value D(x,y), when the brightness image L serves as a reference, the disparity image acquiring unit 3b calculates a deviation amount from the brightness image L to the brightness image R between corresponding pixels as the disparity value D(x,y). Further, in the case of acquiring the disparity image D'(1') based on the brightness image R as the disparity image D used for subsequent processing, it is desirable to calculate a deviation amount from the brightness image R to the brightness image L between corresponding pixels as the disparity value D(x,y). Furthermore, the disparity image acquiring unit 3b determines whether or not corresponding pixels between left and right images of the brightness image L and the brightness image R have approximately the same brightness value information, and calculates the reliability R(x,y) serving as a disparity calculation cost. The disparity image acquiring-unit 3b sets the reliability R(x,y) to a high value when the corresponding pixels are determined to have approximately the same brightness value information, and sets the reliability R(x,y) to a low value when the corresponding pixels are determined not to have approximately the same brightness value information.

Figure 4:
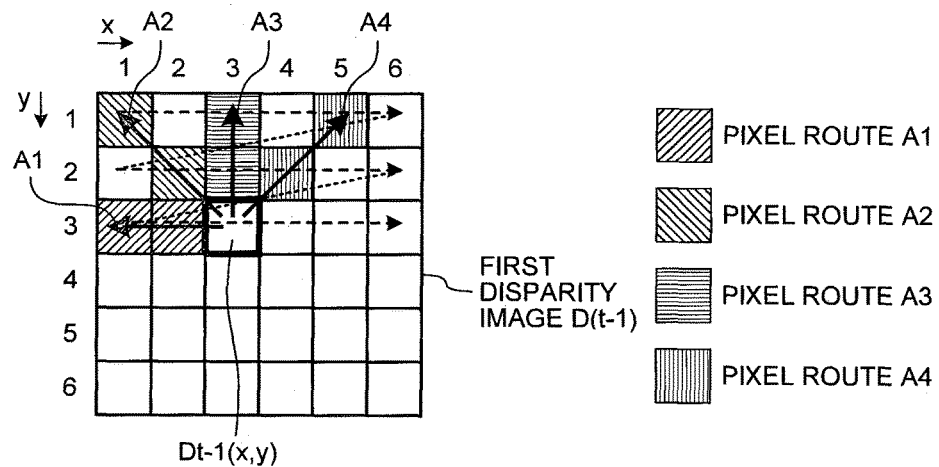
FIG. 4 is a diagram illustrating an exemplary disparity optimization process according to the present embodiment.

The first correcting unit 3c is a first correcting means that optimizes the disparity value D(x,y) of each of the pixels configuring the disparity image D acquired by the disparity image acquiring unit 3b based on disparity values of pixels configuring at least a part of a first pixel route A (A1, A2, A3, A4, . . . ) that is a certain pixel route in at least one direction with respect to the same pixel. In the present embodiment,
the first correcting unit 3c performs the optimization process on a first disparity image D(t−1) acquired by the disparity image acquiring unit 3b at a first time (t−1). For example, as illustrated in FIG. 4, the first correcting unit 3c optimizes a disparity value Dt−1(x,y) of each of the pixels configuring the first disparity image D(t−1) acquired by the disparity image acquiring unit 3b at the first time (t−1) based on disparity values of pixels configuring the first pixel route A (A1, A2, A3, A4, . . . ). In the example of FIG. 4, the first pixel route A (A1, A2, A3, A4, . . . ) is a pixel region that is configured with a plurality of pixels around a target pixel (a pixel surrounded by a thick frame in FIG. 4), and configured with a plurality of pixels configuring a plurality of pixel routes A1, A2, A3, and A4 starting from the same pixel. In other words, FIG. 4 illustrates an example in which a pixel region used for optimizing the disparity value Dt−1(x,y) of the target pixel is configured with pixels on the pixel routes A1, A2, A3, and A4. In this case, the first correcting unit 3c performs the optimization process on the disparity value Dt−1(x,y) of the target pixel using the disparity values of the pixels on the plurality of pixel routes A1, A2, A3, and A4.

For example, the first correcting unit 3c uses the following mathematical formula of optimizing the disparity value of the target pixel in view of smoothness with a neighboring disparity in the optimization process. The following mathematical formula is a formula for deciding $D_p$ in which $E(D_p)$ has a minimum value, and in the present embodiment, $D_p$ decided by the following mathematical formula is used as an optimized disparity value at a pixel position p.

$$E(D_p) = C(p, D_p) + \sum_{q \in N_p} P_1 T[|D_p - D_q| = D_{th}] + \quad \text{[Formula 1]}$$

$$\sum_{q \in N_p} P_2 T[|D_p - D_q| > D_{th}]$$

(Left side) = (First term at right side) +

(Second term at right side) + (Third term at right side)

The details of variables in the mathematical formula expressed in [Formula 1] are as follows.

p indicates a pixel position. The pixel position p may be a central position of a single pixel or may be a central position of a pixel region configured with a plurality of pixels.

$D_p$ indicates a disparity value corresponding to the pixel position p.

$C(p, D_p)$ indicates a cost function.

$N_p$ indicates a neighboring pixel region of the pixel position p. The neighboring pixel region $N_p$ is set not to include a pixel region corresponding to the pixel position p. The neighboring pixel region $N_p$ is set according to various kinds of patterns such as pixel routes illustrated in FIGS. 4 to 10.

q indicates a pixel position configuring the neighboring pixel region $N_p$.

T indicates a logical operator. The logical operator T has a value of "1" when a set condition is "truth" and a value of "0" when a set condition is "false."

$D_{th}$ indicates a threshold value (fixed value) that is set in advance. The threshold value $D_{th}$ is set to indicate whether a difference between the disparity value $D_p$ corresponding to the pixel position p and the disparity value $D_q$ corresponding to the pixel position q configuring the neighboring pixel region $N_p$ is large or small.

$P_1$ and $P_2$ indicate weighting constants. The weighting constant $P_1$ and the weighting constant $P_2$ are set to satisfy $P_1<P_2$.

In the example of FIG. 4, the pixel position p in the mathematical formula expressed in [Formula 1] corresponds to a position (x,y) of each of pixels configuring the first disparity image D(t−1). Here, for convenience of description, the target pixel position p is assumed to be a position of a pixel surrounded by the thick frame in FIG. 4. The disparity value $D_p$ in the mathematical formula expressed in [Formula 1] corresponds to the disparity value Dt−1(x,y) of the target pixel. The neighboring pixel region $N_p$ in the mathematical formula expressed in [Formula 1] corresponds to the pixel routes A1 to A4. The pixel position q in the mathematical formula expressed in [Formula 1] corresponds to positions of pixels configuring the pixel routes A1 to A4. Specifically, when the pixel position q is expressed by an x coordinate and a y coordinate, in the example of FIG. 4, the pixel positions q are positions (2,3) and (1,3) of two pixels configuring the pixel route A1, positions (2,2) and (1,1) of two pixels configuring the pixel route A2, positions (3,2) and (3,1) of two pixels configuring the pixel route A3, and positions (4,2) and (5,1) of two pixels configuring the pixel route A4.

The description of the mathematical formula expressed in [Formula 1] is continued. A first term at the right side of the mathematical formula is a term for calculating a degree of similarity between brightness value information at the pixel position p in one brightness image (for example, the brightness image L) of the left and right brightness images and brightness value information at a pixel position shifted in an x direction (horizontal direction) by the disparity value $D_p$ serving as a shift amount in the other brightness image (for example, the brightness image R) of the left and right brightness images. As the degree of similarity increases, the value of the cost function $C(p,D_p)$ decreases, and as the degree of similarity decreases, the value of the cost function $C(p,D_p)$ increases. In other words, in the present embodiment, the cost function $C(p,D_p)$ corresponds to the reliability R(x,y). The formula of the cost function may be, for example, a known formula such as a disparity cost calculation formula using a sum of absolute difference (SAD) or a disparity cost calculation formula using a formula of a sum of squared difference (SSD).

Second and third terms at the right side in the mathematical formula expressed in [Formula 1] are terms for optimizing a value at the left side in the mathematical formula in view of the disparity value $D_q$ corresponding to the neighboring pixel position q of the pixel position p. Thus, the second and third terms at the right side in the mathematical formula are terms for optimizing the value of the disparity value $D_p$ corresponding to the pixel position p.

For example, in the mathematical formula expressed in [Formula 1], when $D_{th}=1$, in $T[|D_p-D_q|=1]$ of the second term at the right side of the mathematical formula, $T[|D_p-D_q|=1]=1$ if $|D_p-D_q|=1$, and $T[|D_p-D_q|=1]=0$ if $|D_p-D_q|\neq 1$. Similarly, when $D_{th}=1$, in $T[|D_p-D_q|>1]$ of the third term at the right side of the mathematical formula, $T[|D_p-D_q|=1]=1$ if $|D_p-D_q|>1$, and $T[|D_p-D_q|=1]=0$ if $|D_p-D_q|\leq 1$. Thus, in the mathematical formula expressed in [Formula 1], when $D_{th}=1$, none of $P_1$ and $P_2$ is added in a pattern (1) $|D_p-D_q|<D_{th}$, $P_1$ is added in a pattern (2) $|D_p-D_q|=D_{th}$, and $P_2$ is added in a pattern (3) $|D_p-D_q|>D_{th}$.

In other words, as the number of pixel positions q around the pixel position p in which a difference $|D_p-D_q|$ between the disparity value $D_p$ corresponding to the pixel position p and the disparity value $D_q$ corresponding to the pixel position q configuring the neighboring pixel region Np is larger than a certain value (the threshold value $D_{th}$) increases in the set neighboring pixel region $N_p$, the value of the left side $E(D_p)$ of the mathematical formula expressed in [Formula 1] is likely to increase. In other words, as the likelihood that a disparity value change from the pixel position p through the neighboring pixel region $N_p$ is smooth in the distribution of disparity values of respective pixel positions decreases, the value of the left side $E(D_p)$ of the mathematical formula is likely to increase. In other words, the reliability of the disparity value is likely to be lowered. Meanwhile, as the number of neighboring pixel positions q around the pixel position p in which the difference $|D_p-D_q|$ between the disparity value $D_p$ corresponding to the pixel position p and the disparity value $D_q$ corresponding to the pixel position q configuring the neighboring pixel region Np is less than the certain value (the threshold value $D_{th}$) increases, the value of the left side $E(D_p)$ of the mathematical formula is likely to decrease. In other words, as the likelihood that a disparity value change from the pixel position p through the neighboring pixel region $N_p$ is smooth in the distribution of disparity values of respective pixel positions increases, the value of the left side $E(D_p)$ of the mathematical formula is likely to decrease. In other words, the reliability of the disparity value is likely to be increased.

In the present embodiment, a disparity value $D_p$ at which $E(D_p)$ has a minimum value is inspected by performing the calculation on each disparity value $D_p$ (=$D_p1$, $D_p2$, $D_p3$, that is a variable of the formula within a set range, similarly to the disparity value deciding method of the related art. Then, the disparity value $D_p$ at which $E(D_p)$ has the minimum value is decided as a final disparity value. Thus, when the disparity value $D_p$ corresponding to the pixel position p is decided, the disparity value $D_p$ when the likelihood that the disparity value change from the pixel position p through the neighboring pixel region $N_p$ is smooth is high in the distribution of disparity values of respective pixel positions is more likely to be selected as a final disparity value than the disparity value $D_p$ when the likelihood that the disparity value change from the pixel position p through the neighboring pixel region $N_p$ is smooth is low.

As a result, compared to when the disparity value is calculated without considering the disparity value $D_q$ corresponding to the pixel position q configuring the neighboring pixel region Np (that is, using only the first term at the right side of the mathematical formula expressed in [Formula 1]), when the disparity value is calculated in view of the disparity value $D_q$ corresponding to the pixel position q configuring the neighboring pixel region Np (that is, using the second and third terms as well as the first term at the right side of the mathematical formula), it is possible to calculate an optimized disparity value in view of smoothness of a neighboring disparity value.

Figure 5:
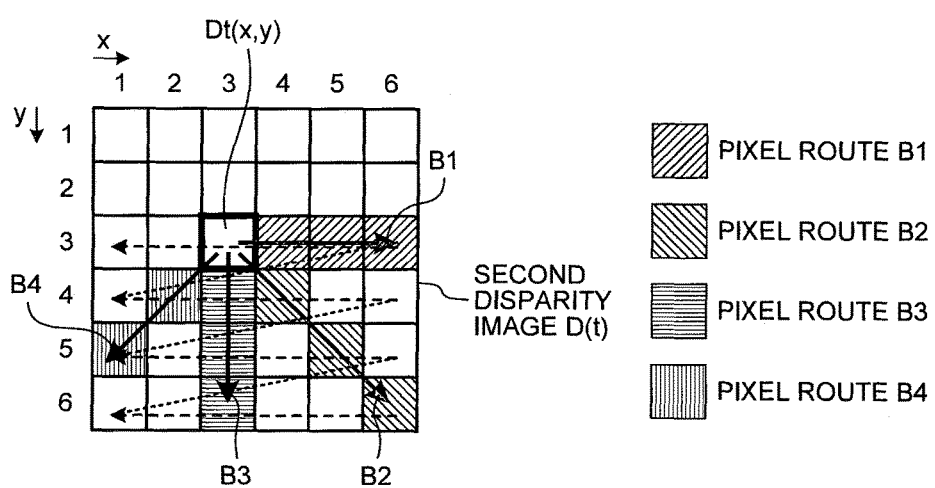
FIG. 5 is a diagram illustrating an exemplary disparity optimization process according to the present embodiment.

Referring back to FIG. 3, the second correcting unit 3d is a second correcting means that optimizes the disparity value D(x,y) of each of the pixels configuring the disparity image D acquired by the disparity image acquiring unit 3b based on disparity values of pixels configuring at least a part of a second pixel route B (B1, B2, B3, B4, . . . ) that is a certain pixel route in at least one direction with respect to the same pixel and a pixel route different from the first pixel route A. Here, the pixel route different from the first pixel route A represents a pixel route in a direction approximately opposite to a direction of the first pixel route. In the present embodiment, the second correcting unit 3d performs the optimization process on a second disparity image D(t) acquired by the disparity image acquiring unit 3b at a second time (t) that is a time after the first time (t−1). For example, as illustrated in FIG. 5, the second correcting unit 3d optimizes the disparity value Dt(x,y) of each of the pixels configuring the second disparity image D(t) acquired by the disparity image acquiring unit 3b at the second time (t) based on disparity values of pixels configuring the second pixel route B (B1, B2, B3, B4, . . . ). In the example of FIG. 5, the second pixel route B (B1, B2, B3, B4, . . . ) is a pixel region that is configured with a plurality of pixels around a target pixel (a pixel surrounded by a thick frame in FIG. 5), and configured with a plurality of pixels configuring a plurality of pixel routes B1, B2, B3, and B4 starting from the same pixel. In other words, FIG. 5 illustrates an example in which a pixel region used for optimizing the disparity value Dt(x,y) of the target pixel is configured with pixels on the pixel routes B1, B2, B3, and B4. In this case, the second correcting unit 3d performs the optimization process on the disparity value Dt(x,y) of the target pixel using the disparity values of the pixels on the plurality, of pixel routes B1, B2, B3, and B4.

For example, the second correcting unit 3d uses the mathematical, formula expressed in [Formula 1] of optimizing the disparity value in view of smoothness with a neighboring disparity in the optimization process, similarly to the first correcting unit 3c. In the example of FIG. 5, the pixel position p in the mathematical formula expressed in [Formula 1] corresponds to a position (x,y) of each of pixels configuring the second disparity image D(t). Here, for convenience of description, the target pixel position p is assumed to be a position of a pixel surrounded by the thick frame in FIG. 5. The disparity value $D_p$ in the mathematical formula expressed in [Formula 1] corresponds to the disparity value Dt(x,y) of the target pixel. The neighboring pixel region $N_p$ in the mathematical formula expressed in [Formula 1] corresponds to the pixel routes B1 to B4. The pixel position q in the mathematical formula expressed in [Formula 1] corresponds to positions of pixels configuring the pixel routes B1 to B4. Specifically, when the pixel position q is expressed by an x coordinate and a y coordinate, in the example of FIG. 5, the pixel positions q are positions (4,3), (5,3), and (6,3) of three pixels configuring the pixel route B1, positions (4,4), (5,5), and (6,6) of three pixels configuring the pixel route B2, positions (3,4), (3,5), and (3,6) of three pixels configuring the pixel route B3, and positions (2,4) and (2,5) of two pixels configuring the pixel route B4.

Figure 6:
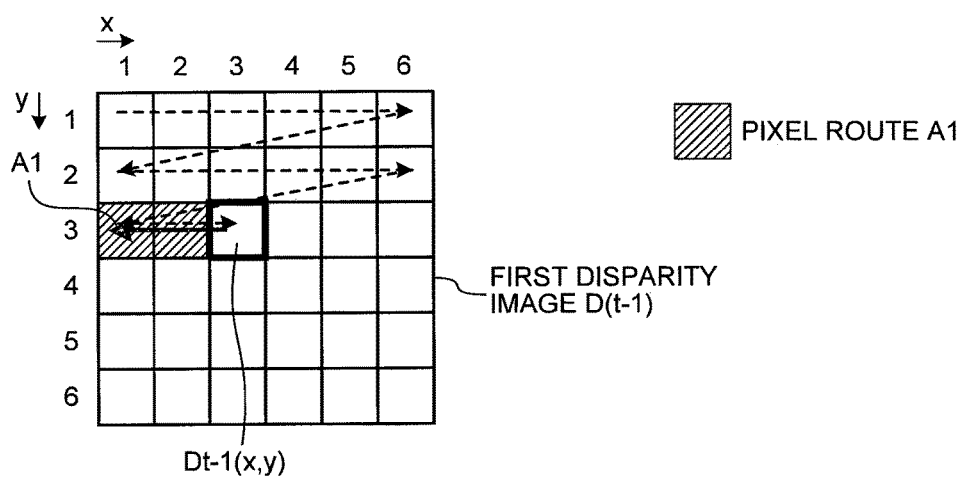
FIG. 6 is a diagram illustrating an exemplary disparity optimization process according to the present embodiment.

FIG. 4 illustrates an example in which the first correcting unit 3c optimizes the disparity value Dt−1(x,y) of the target pixel based on disparity values of pixels configuring the first pixel route A (A1, A2, A3, and A4) in four directions with respect to the same pixel, but the present invention is not limited to this example. For example, as illustrated in FIG. 6, when a pixel region used to optimize the disparity value Dt−1(x,y) of the target pixel is configured with pixels on the pixel route A1 in one direction with respect to the target pixel, the first correcting unit 3c may optimize the disparity value Dt−1(x,y) of the target pixel using disparity values of the pixels on the pixel route A1. In the example of FIG. 6, the neighboring pixel region $N_p$ in the mathematical formula expressed in [Formula 1] corresponds to the pixel route A1. The pixel position q in the mathematical formula expressed in [Formula 1] corresponds to positions of the pixels configuring the pixel route A1. Specifically, when the pixel position q is expressed by an x coordinate and a y coordinate, in the example of FIG. 6, the pixel positions q are positions (2,3) and (1,3) of two pixels configuring the pixel route A1.

Figure 7:
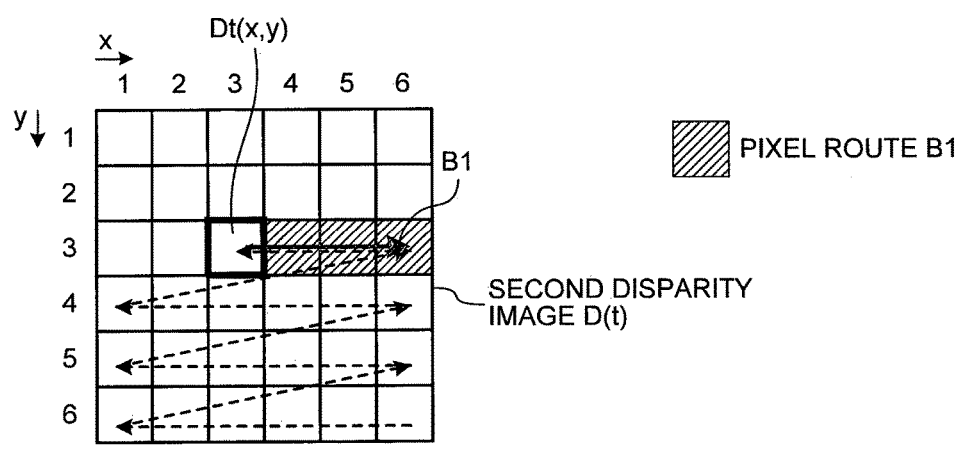
FIG. 7 is a diagram illustrating an exemplary disparity optimization process according to the present embodiment.

FIG. 5 illustrates the example in which the second correcting unit 3d optimizes the disparity value Dt(x,y) of the target pixel based on disparity values of pixels configuring the second pixel route B (B1, B2, B3, and B4) in four directions with respect to the same pixel, but the present invention is not limited to this example. For example, as illustrated in FIG. 7, when a pixel region used to optimize the disparity value Dt(x,y) of the target pixel is configured with pixels on the pixel route B1 in one direction with respect to the target pixel, the second correcting unit 3d may optimize the disparity value Dt(x,y) of the target pixel using disparity values of the pixels on the pixel route B1. In the example of FIG. 7, the neighboring pixel region $N_p$ in the mathematical formula expressed in [Formula 1] corresponds to the pixel route B1. The pixel position q in the mathematical formula expressed in [Formula 1] corresponds to positions of the pixels configuring the pixel route B1. Specifically, when the pixel position q is expressed by an x coordinate and a y coordinate, in the example of FIG. 7, the pixel positions q are positions (4,3), (5,3), and (6,3) of three pixels configuring the pixel route B1.

Further, as a combination of pixel routes used for optimization by the first correcting unit 3c and the second correcting unit 3d, a combination of the pixel route A2 and the pixel route B2, a combination of the pixel route A3 and the pixel route B3, a combination of the pixel route A4 and the pixel route B4, or the like as well as a combination of the pixel route A1 and pixel route B1 illustrated in FIGS. 6 and 7 may be used. In other words, a combination of pixel routes used for optimization by the first correcting unit 3c and the second correcting unit 3d is preferably a combination of pixel routes in opposite directions.

FIG. 6 illustrates the example in which the first correcting unit 3c optimizes the disparity value Dt−1(x,y) of the target pixel based on disparity values of all pixels configuring the first pixel route A1 in one direction with respect to the same pixel, and FIG. 7 illustrates the example in which the second correcting unit 3d optimizes the disparity value Dt(x,y) of the target pixel based on disparity values of all pixels configuring the first pixel route B1 in one direction with respect to the same pixel, but the present invention is not limited to this example.

Figure 8:
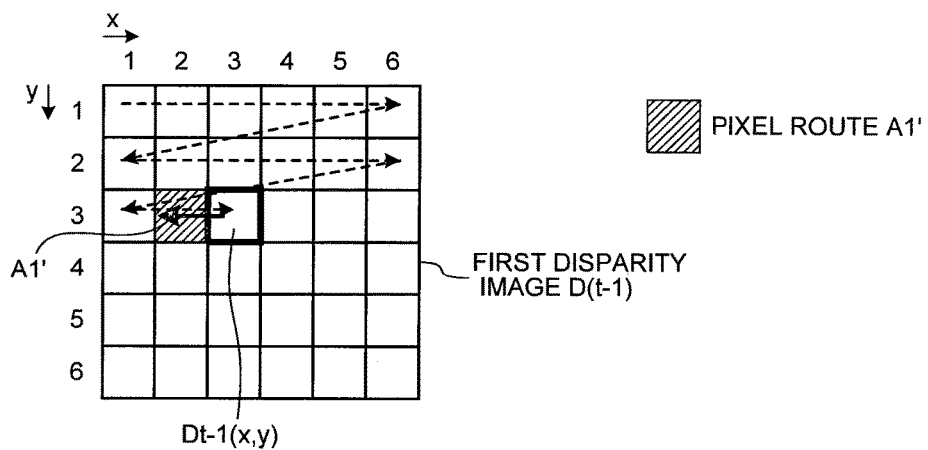
FIG. 8 is a diagram illustrating an exemplary disparity optimization process according to the present embodiment.

For example, as illustrated in FIG. 8, when a pixel region used to optimize the disparity value Dt−1(x,y) of the target pixel is configured with pixels on a pixel route A1' in one direction with respect to the target pixel, the first correcting unit 3c may optimize the disparity value Dt−1(x,y) of the target pixel using disparity values of the pixels on the pixel route A1'. Here, the pixel route A1' of FIG. 8 is configured with only one pixel close to the target pixel among the pixels configuring the pixel route A1 of FIG. 6. In the example of FIG. 8, the neighboring pixel region $N_p$ in the mathematical formula expressed in [Formula 1] corresponds to the pixel route A1'. The pixel position q in the mathematical formula expressed in [Formula 1] corresponds to positions of the pixels configuring the pixel route A1'. Specifically, when the pixel position q is expressed by an x coordinate and a y coordinate, in the example of FIG. 8, the pixel position q is a position (2,3) of one pixel configuring the pixel route A1'.

Figure 9:
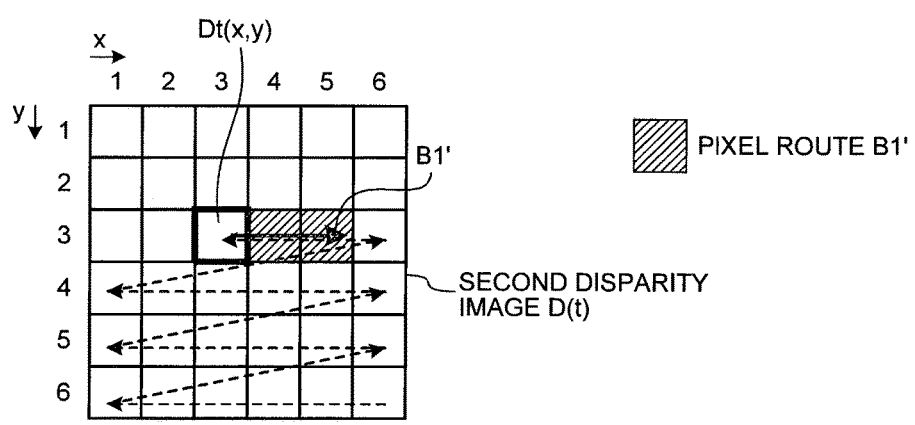
FIG. 9 is a diagram illustrating an exemplary disparity optimization process according to the present embodiment.

Further, as illustrated in FIG. 9, when a pixel region used to optimize the disparity value Dt(x,y) of the target pixel is configured with pixels on the pixel route B1' in one direction with respect to the target pixel, the second correcting unit 3d may optimize the disparity value Dt(x,y) of the target pixel using disparity values of pixels on the pixel route B1'. Here, the pixel route B1' of FIG. 9 is configured with only two pixels close to the target pixel among the pixels configuring the pixel route B1 of FIG. 7. In the example of FIG. 9, the neighboring pixel region $N_p$ in the mathematical formula expressed in [Formula 1] corresponds to the pixel route B1'. The pixel position q in the mathematical formula expressed in [Formula 1] corresponds to positions of the pixels configuring the pixel route B1'. Specifically, when the pixel position q is expressed by an x coordinate and a y coordinate, in the example of FIG. 9, the pixel positions q are positions (4,3) and (5,3) of two pixels configuring the pixel route B1'.

In the present embodiment, pixels configuring a pixel region for optimization are not limited to pixels present on the pixel route and may be set from a pixel region that has been subjected to the raster scan. In this case, pixels configuring a pixel region for optimization used by the first correcting unit 3c and pixels configuring a pixel region for optimization used by the second correcting unit 3d are preferably pixels positioned in approximately opposite directions at corresponding points of two contrastive images of the first disparity image D(t−1) and the second disparity image D(t) as illustrated in a pixel region A of FIG. 10 and a pixel region B of FIG. 11 (pixels surrounded by a thick frame in FIG. 10 and pixels surrounded by a thick frame in FIG. 11). In the example of FIG. 10, the neighboring pixel region $N_p$ in the mathematical formula expressed in [Formula 1] corresponds to the pixel region A. The pixel position q in the mathematical formula expressed in [Formula 1] corresponds to positions of pixels configuring the pixel region A. Specifically, when the pixel position q is expressed by an x coordinate and a y coordinate, in the example of FIG. 10, the pixel positions q are positions (1,1), (2,1), (3,1), (4,1), (5,1), (1,2), (2,2), (3,2), (4,2), (1,3), and (2,3) of 11 pixels configuring the pixel region A. In the example of FIG. 11, the neighboring pixel region $N_p$ in the mathematical formula expressed in [Formula 1] corresponds to the pixel region B. The pixel position q in the mathematical formula expressed in [Formula 1] corresponds to positions of pixels configuring the pixel region B. Specifically, when the pixel position q is expressed by an x coordinate and a y coordinate, in the example of FIG. 11, the pixel positions q are positions (6,6), (5,6), (4,6), (3,6), (2,6), (1,6), (6,5), (5,5), (4,5), (3,5), (2,5), (1,6), (6,4), (5,4), (4,4), (3,4), (2,4), (6,3), (5,3), and (4,3) of 20 pixels configuring the pixel region B.

Referring back to FIG. 3, the vehicle information acquiring unit 3e is a vehicle information acquiring means that acquires the movement information of the vehicle. The vehicle information acquiring unit 3e acquires the vehicle speed, the yaw rate, and the acceleration input from the vehicle momentum detecting device 2 as the movement information of the vehicle.

The associating unit 3f is an associating means that associates a certain pixel position configuring the first disparity image D(t−1) with a certain pixel position configuring the second disparity image D(t) so that the certain pixel positions become the same imaging position based on the movement information of from the first time (t−1) to the second time (t) acquired by the vehicle information acquiring unit 3e. As illustrated in FIG. 12, for chronologically consecutive disparity images, the associating unit 3f shifts points of the disparity image D(t−1) of an immediately previous frame by an own vehicle momentum, and associates the shifted points with points of the disparity image D(t) of a current frame present at the same position in image coordinates. In FIG. 12, for a disparity image D(t−1) at a time t−1, the associating unit 3f shifts a disparity point by an own vehicle momentum so that the disparity image D(t−1) at the time t−1 can be compared with a disparity image D(t) at a time t (the shifted disparity image D'(t−1) at the time t−1 in FIG. 12). Then, the associating unit 3f associates the points at the same positions on the images using the shifted disparity image D'(t−1) at the time t−1 and the disparity image D(t) at the time t.

For example, the associating unit 3f performs a process of associating the points at the same positions on the images using the shifted disparity image D'(t−1) at the time t−1 and the disparity image D(t) at the time t according to the following method. For example, a technique of deriving a disparity point $(u_t, v_t, d_t)$ at the time t obtained by shifting a disparity point $(u_{t-1}, v_{t-1}, d_{t-1})$ at the time t−1 by an own vehicle momentum from the time t−1 to the time t is as follows. First, an image coordinate point $(u_{t-1}, v_{t-1}, d_{t-1})$ at the time t−1 is converted into a vehicle coordinate point $(X_{t-1}, Y_{t-1}, Z_{t-1})$ according to the following formula. Here, f indicates a focal distance, and b indicates a base line length.

$$X_{t-1} = \frac{u_{t-1} \cdot b}{d_{t-1}} \quad Y_{t-1} = \frac{v_{t-1} \cdot b}{d_{t-1}} \quad Z_{t-1} = \frac{f \cdot b}{d_{t-1}} \quad \text{[Formula 2]}$$

Then, a vehicle coordinate point $(X_t, Y_t, Z_t)$ at the time t obtained by shifting the vehicle coordinate point $(X_{t-1}, Z_{t-1})$ at the time t−1 by an own vehicle momentum from the time t−1 to the time t is calculated according to the following formula. Here, R indicates a rotational component of the own vehicle momentum, and T indicates a translation component of the own vehicle momentum.

$$\begin{pmatrix} X_t \\ Y_t \\ Z_t \end{pmatrix} = R \begin{pmatrix} X_{t-1} \\ Y_{t-1} \\ Z_{t-1} \end{pmatrix} + T \quad \text{[Formula 3]}$$

Finally, the vehicle coordinate point $(X_t, Y_t, Z_t)$ at the time t is converted into an image coordinate point $(u_t, v_t, d_t)$ according to the following formula.

$$u_t = \frac{f \cdot X_t}{Z_t} \quad v_t = \frac{f \cdot Y_t}{Z_t} \quad d_t = \frac{f \cdot b}{Z_t} \quad \text{[Formula 4]}$$

Referring back to FIG. 3, the disparity image generating unit 3g is a disparity image generating means that applies the optimization process performed by the first correcting unit 3c to the first disparity image D(t−1) acquired at the first time (t−1) by the disparity image acquiring unit 3b, applies the optimization process performed by the second correcting unit 3d to the second disparity image D(t) acquired at the second time (t) after the first time (t−1) by the disparity image acquiring unit 3b, and calculates and generates a desired disparity image D2 based on a comparison of the first disparity image D(t−1) corrected by the first correcting unit 3c and the second disparity image D(t) corrected by the second correcting unit 3d.

Here, the disparity image generating unit 3g compares the first disparity image D(t−1) optimized by the first correcting unit 3c with the second disparity image D(t) optimized by the second correcting unit 3d for each pixel between pixels associated by the associating unit 3f, and calculates the desired disparity image D2. In the present embodiment, the desired disparity image D2 is preferably obtained by correcting the second disparity image D(t). Here, the desired disparity image D2 may be a newly generated image separately from the second disparity image D(t).

Specifically, when the desired disparity image D2 is calculated and generated by comparing a difference between the disparity value of the first disparity image D(t−1) optimized by the first correcting unit 3c with the disparity value of the second disparity image D(t) optimized by the second correcting unit 3d for each pixel, the disparity image generating unit 3g suppresses the disparity value of the same pixel in the second disparity image D(t) not to be used as the disparity value of the desired disparity image D2 when the difference between the disparity values is greater than or equal to a certain determination threshold value Th, and promotes the disparity value of the same pixel in the second disparity image D(t) to be used as the disparity value of the desired disparity image D2 when the difference between the disparity values is smaller than the determination threshold value Th.

In the present embodiment, "promoting a disparity value to be used as a disparity value" includes (i) "being used as a disparity value" and (ii) "setting reliability of a disparity value to be high, for example, by setting a flag indicating that reliability is high." Further, "suppressing a disparity value not to be used as a disparity value" includes (iii) "being not used as a disparity value" and (iv) "setting reliability of a disparity value to be low, for example, by setting a flag indicating that reliability is low."

In the present embodiment, when the desired disparity image D2 is calculated and generated by comparing a difference between the disparity value of the first disparity image D(t−1) optimized by the first correcting unit 3c and the disparity value of the second disparity image D(t) optimized by the second correcting unit 3d for each pixel, the disparity image generating unit 3g does not use the disparity value of the same pixel in the second disparity image D(t) as the disparity value of the desired disparity image when the difference between the disparity values is greater than or equal to the determination threshold value Th, and uses the disparity value of the same pixel in the second disparity image D(t) as the disparity value of the desired disparity image when the difference between the disparity values is smaller than the determination threshold value Th.

For example, as illustrated in FIGS. 13(a) and 13(b), the disparity image generating unit 3g calculates a difference between the disparity values of the associated disparity points of a shifted disparity image D'(t−1) at a time t−1 of FIG. 13(a) and a disparity image D(t) at a time t of FIG. 13(b), determines that an optimal solution is wrong when the difference value is greater than or equal to the determination threshold value Th, and removes the disparity value. However, the disparity image generating unit 3g calculates a difference between the disparity values of the associated disparity points, determines that an optimal solution is correct when the difference value is smaller than the determination threshold value Th, and holds the disparity value. Here, when the disparity value of the disparity point at the position (x,y) in the disparity image D(t) at the time t is assumed to be Dt(x,y), and the disparity value of the disparity point at the position (x,y) in the shifted disparity image D'(t−1) at the time t−1 is assumed to be Dt−1(x,y), the disparity image generating unit 3g holds the disparity value in the disparity image D(t) at the time t when |Dt(x,y)−Dt−1(x,y)|<Th, and removes the disparity value in the disparity image D(t) at the time t when |Dt(x,y)−Dt−1(x,y)|≥Th. As a result, each disparity point of the disparity image D(t) at the time t is held or removed.

In the present embodiment, the certain determination threshold value Th is a determination threshold value that is decided according to a disparity value with reference to a map specified so that a threshold value increases as the disparity value Dt(x,y) increases as illustrated in FIG. 14. In the present embodiment, the certain determination threshold value Th may be a determination threshold value that is set as a fixed value in advance.

Further, when the desired disparity image D2 is calculated and generated by comparing a difference between the disparity value of the first disparity image D(t−1) optimized by the first correcting unit 3c and the disparity value of the second disparity image D(t) optimized by the second correcting unit 3d for each pixel, the disparity image generating unit 3g may set the disparity value of the same pixel in the second disparity image D(t) to the desired disparity image as a disparity value with low reliability when the difference between the disparity values is greater than or equal to the determination threshold value Th, and may set the disparity value of the same pixel in the second disparity image D(t) to the desired disparity image D2 as a disparity value with high reliability when the difference between the disparity values is smaller than the determination threshold value.

In this case, for example, as illustrated in FIGS. 13(a) and 13(b), the disparity image generating unit 3g calculates a difference between the disparity values of the associated disparity points of the shifted disparity image D'(t−1) at the time t−1 of FIG. 13(a) and the disparity image D(t) at the time t of FIG. 13(b), determines that the optimal solution is wrong when the difference value is greater than or equal to the determination threshold value Th, and sets the reliability flag of the disparity value to OFF. Meanwhile, the disparity image generating unit 3g calculates a difference between the disparity values of the associated disparity points, determines that the optimal solution is correct when the difference value is smaller than the determination threshold value Th, and sets the reliability flag of the disparity value to ON. Here, when the disparity value of the disparity point at the position (x,y) in the disparity image D(t) at the time t is assumed to be Dt(x,y), and the disparity value of the disparity point at the position (x,y) in the shifted disparity image D'(t−1) at the time t−1 is assumed to be Dt−1(x,y), the reliability flag of the disparity point at the position (x,y) in the disparity image D(t) at the time t is set to ON when |Dt(x,y)−Dt−1(x,y)|<Th. Meanwhile, the reliability flag of the disparity point at the position (x,y) in the disparity image D(t) at the time t is set to OFF when |Dt(x,y)−Dt−1(x,y)|≥Th. As a result, the reliability flag of each disparity point of the disparity image D(t) at the time t is set to ON or OFF.

Here, an exemplary image generated by the disparity image generating unit 3g is now described with reference to FIGS. 15(a) to 15(d). FIG. 15(a) illustrates a disparity image in which disparity values (disparity values 1 to 7 in FIG. 15(a) are allocated to pixels. In the disparity image of FIG. 15(a), disparity values optimized by processing of the first correcting unit 3c and the second correcting unit 3d are allocated to pixels. Here, when the determination threshold value Th of the difference value between the disparity values is assumed to be 5, the disparity image generating unit 3g performs processing such that disparity values of pixels having a disparity value greater than or equal to the disparity value 5 are removed, and disparity values of pixels having disparity values of the disparity values 1 to 4 smaller than the disparity value 5 are maintained as illustrated in FIG. 15(b). Alternatively, the disparity image generating unit 3g performs processing such that the reliability flag is set to OFF for pixels having a disparity value greater than or equal to the disparity value 5, and the reliability flag is set to ON for pixels having disparity values of the disparity values 1 to 4 smaller than the disparity value 5 as illustrated in FIG. 15(c) (in FIG. 15(c), the reliability flag set to ON corresponds to an o mark, and the reliability flag set to OFF corresponds to an x mark. Then, the disparity image generating unit 3g performs processing such that an image configured with only pixels holding the disparity value or pixels in which the reliability flag is set to ON is generated as illustrated in FIG. 15(d). The image of FIG. 15(d) is configured with only pixels having disparity values of the second disparity image D(t) in which the difference between the disparity value of the first disparity image D(t−1) optimized by processing of the first correcting unit 3c and the disparity value of the second disparity image D(t) optimized by processing of the second correcting unit 3d is determined to be smaller than the determination threshold value Th in processing of the disparity image generating unit 3g. As a result, the disparity image generating unit 3g generates the disparity image of FIG. 15(d) as the desired disparity image D2.

Referring back to FIG. 3, the object detecting unit 3h is an object detecting means that detects an object using the desired disparity image D2 generated by the disparity image generating unit 3g. The object detecting unit 3h detects an object by analyzing whether or not there is an object of a detection target (for example, a pedestrian or the like) within the desired disparity image D2 generated by the disparity image generating unit 3g through a pattern matching technique or the like.

The vehicle control unit 3i is a vehicle control means that performs driving support control for controlling behavior of the vehicle such that the vehicle avoids the object detected by the object detecting unit 3h. For example, the vehicle control unit 3i calculates a traveling trajectory or a traveling speed at which the vehicle can avoid the object based on a vehicle speed and acceleration of the vehicle, various kinds of information indicating a region in which the vehicle can travel, a position of an object of an avoidance target, or the like. Then, the vehicle control unit 3i outputs a control signal based on the calculation process result to the actuator 4, and operates the actuator 4 to perform avoidance control. The vehicle control unit 3i performs steering support so that the vehicle avoids the object by controlling a rudder angle of a steering wheel of the vehicle through the actuator 4 such as an EPS as the avoidance control. The vehicle control unit 3i may perform brake support in combination with the steering support so that an object can be reliably avoided as the avoidance control. In this way, the vehicle control unit 3i functions as an avoidance control means that avoids movement of the vehicle toward a position of an object.

Next, processing performed in the disparity image generating device having the above configuration will be described with reference to FIG. 16. Here, FIG. 16 is a flowchart illustrating exemplary basic processing of the disparity image generating device according to the present invention.

Figure 16:
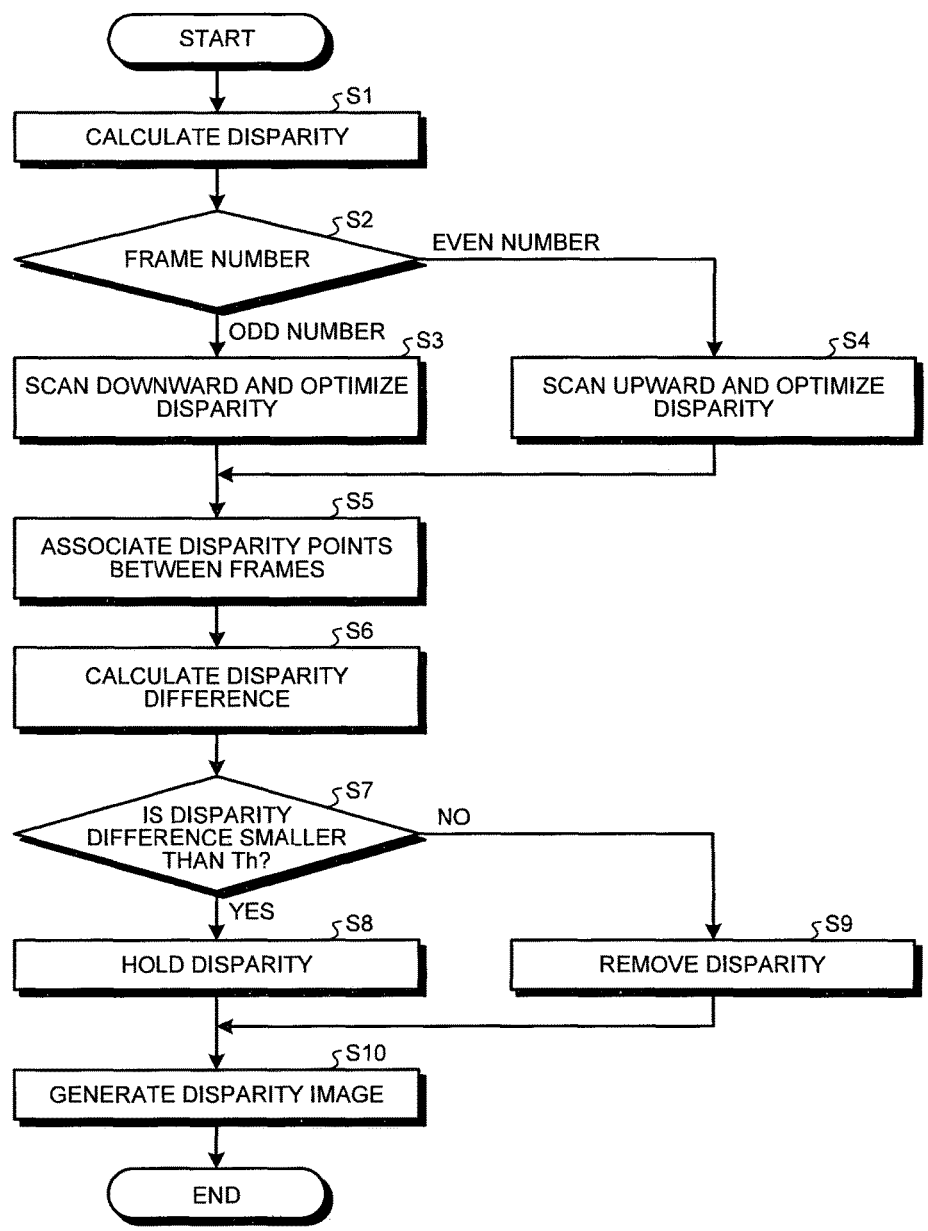
FIG. 16 is a flowchart illustrating exemplary basic processing of a disparity image generating device according to the present invention.

As illustrated in FIG. 16, the ECU 3 searches for corresponding points between distortion-corrected brightness images of left and right cameras, and calculates a disparity image (step S1).

The ECU 3 determines whether a frame number corresponding to an imaging timing number of the disparity image calculated in step S1 is an odd number or an even number (step S2).

In step S2, for example, when the frame number is assumed to range from 1 to 10, odd numbered frames are 1, 3, 5, 7, and 9. Further, even numbered frames are 2, 4, 6, 8, and 10. In the process of FIG. 16, when the first time (t−1) is assumed to be the odd numbered frame 1, the second time (t) is the even numbered frame 2. Further, when the first time (t−1) is assumed to be the odd numbered frame 3, the second time (t) is the even numbered frame 4.

Similarly, when the first time (t−1) is assumed to be the odd numbered frames 5, 7, and 9, the second time (t) are the even numbered frames 6, 8, and 10.

When the frame number is determined to be the odd number in step S2 (odd number in step S2), the ECU 3 performs the raster scan from an upper line to a lower line starting from a pixel at an upper left of an image when the frame number is the odd number as illustrated in FIG. 4, and optimizes a disparity (step S3). Thereafter, the process proceeds to step S5.

When the frame number is determined to be the even number in step S2 (even number in step S2), the ECU 3 performs the raster scan from a lower line to an upper line starting from a pixel at an lower right of an image when the frame number is the even number as illustrated in FIG. 5, and optimizes a disparity (step S4). Thereafter, the process proceeds to step S5.

After the optimization processes of step S3 and step S4, the ECU 3 associates the disparity points between frames (step S5). Specifically, as illustrated in FIG. 12, for chronologically consecutive disparity images, the ECU 3 shifts points of the disparity image D(t−1) of an immediately previous frame by an own vehicle momentum, and associates the shifted points with points of the disparity image D(t) of a current frame present at the same position in image coordinates.

The ECU 3 calculates a disparity difference from the disparity images associated in step S5 (step S6). The ECU 3 determines whether or not the disparity difference calculated in step S6 is smaller than the determination threshold value Th for each pixel (step S7). When the disparity difference is determined to be smaller than the determination threshold value Th in step S7 (Yes in step S7), the ECU 3 holds the disparity value for the pixel (step S8). However, when the disparity difference is determined to be greater than or equal to the determination threshold value Th in step S7 (No in step S7), the ECU 3 removes the disparity value for the pixel (step S9). The ECU 3 generates a disparity image based on the processing results of step S8 and step S9 (step S10). For example, in step S10, the ECU 3 generates the image illustrated in FIGS. 15(a) to 15(d). Thereafter, the present process ends.

As described above, in the present embodiment, it is possible to perform the disparity value optimization process on the chronologically consecutive disparity images while switching the scanning direction of the optimization process in units of frames, compare the disparity values of the corresponding disparity points of chronologically consecutive two disparity images having the different scanning directions, and determine that the optimal solution is wrong when the difference between the disparity values is large. Specifically, it is possible to scan a target disparity image only once in the disparity value optimization process and switch the scanning direction of the optimization process in units of frames such that the raster scan performed from the upper line to the lower line starting from the pixel at the upper left of the image and the raster scan performed from the lower line to the upper line starting from the pixel at the lower right of the image are alternately performed. As a result, it is possible to suppress the processing amount necessary for one frame since the number of scanning in the optimization process is once. Further, the scanning direction of the optimization process may be switched in units of frames such that the raster scan performed from the left column to the right column starting from a pixel at the upper left of an image and the raster scan performed from the right column to the left column starting from a pixel at the lower right of the image are alternately performed.

Figure 1:
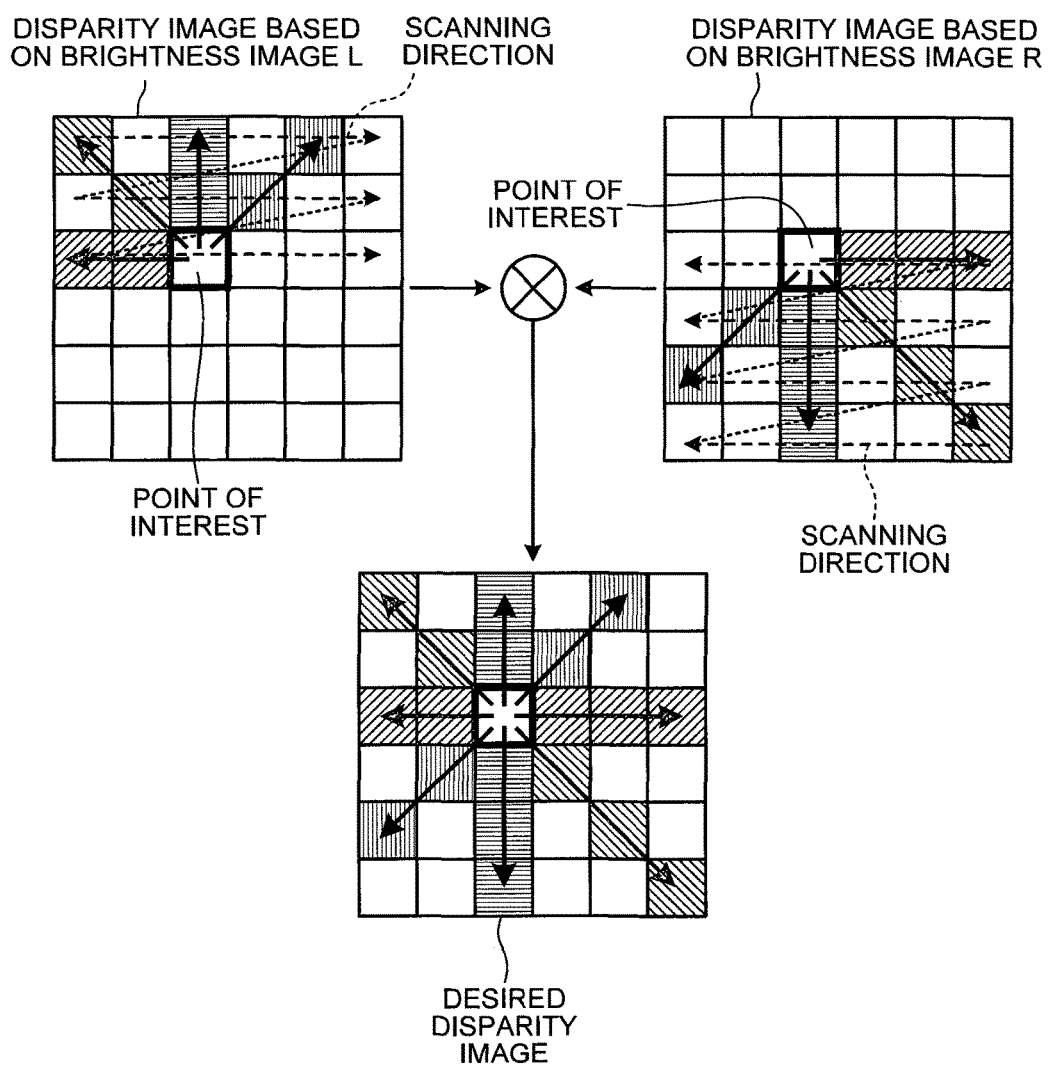
FIG. 1 is a diagram illustrating an overview of an optimization process in a dense disparity image generating technique according to a related art.
Figure 2:
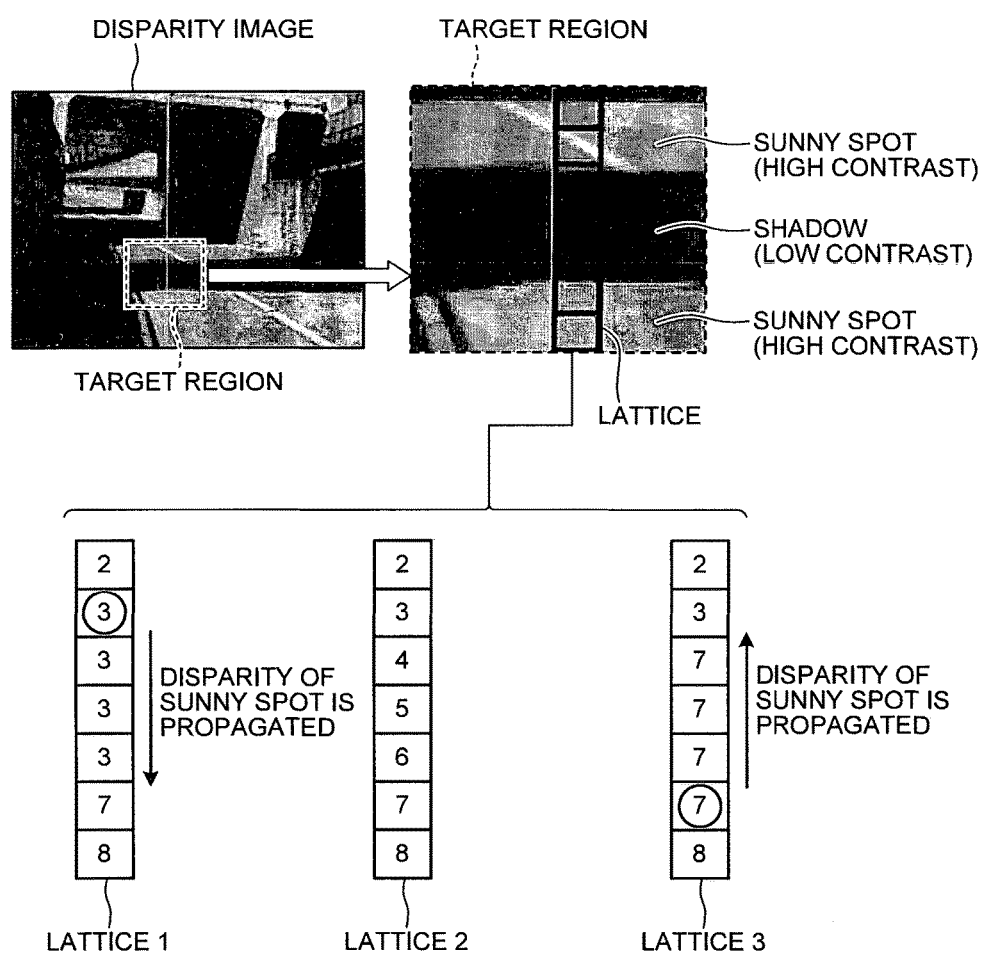
FIG. 2 is a diagram illustrating exemplary disparity values calculated when an optimization process is performed by one-direction raster scan.

Further, in the present embodiment, the disparity values of the associated disparity points are compared, and for example, when the difference between the disparity values is greater than or equal to the determination threshold value Th, the optimal solution is determined to be wrong, and the disparity is removed. Thus, it is possible to suppress the use of a disparity value of a pixel position (for example, a shadow or the like) in which an erroneous disparity value is likely to be calculated and calculate the desired disparity image D2 configured with only disparity values with high reliability accuracy. Here, when the optimization process is performed by one-direction raster scan as illustrated in FIG. 2, a disparity of a horizontal surface having a low contrast is optimized by information with a high contribution degree of a disparity of a horizontal surface having a high contrast, and an erroneous optimal solution is derived. However, according to the present embodiment, it is possible to compare disparity images that differ in the scanning direction of the optimization process and identify an erroneously derived optimal solution.

Figure 17:
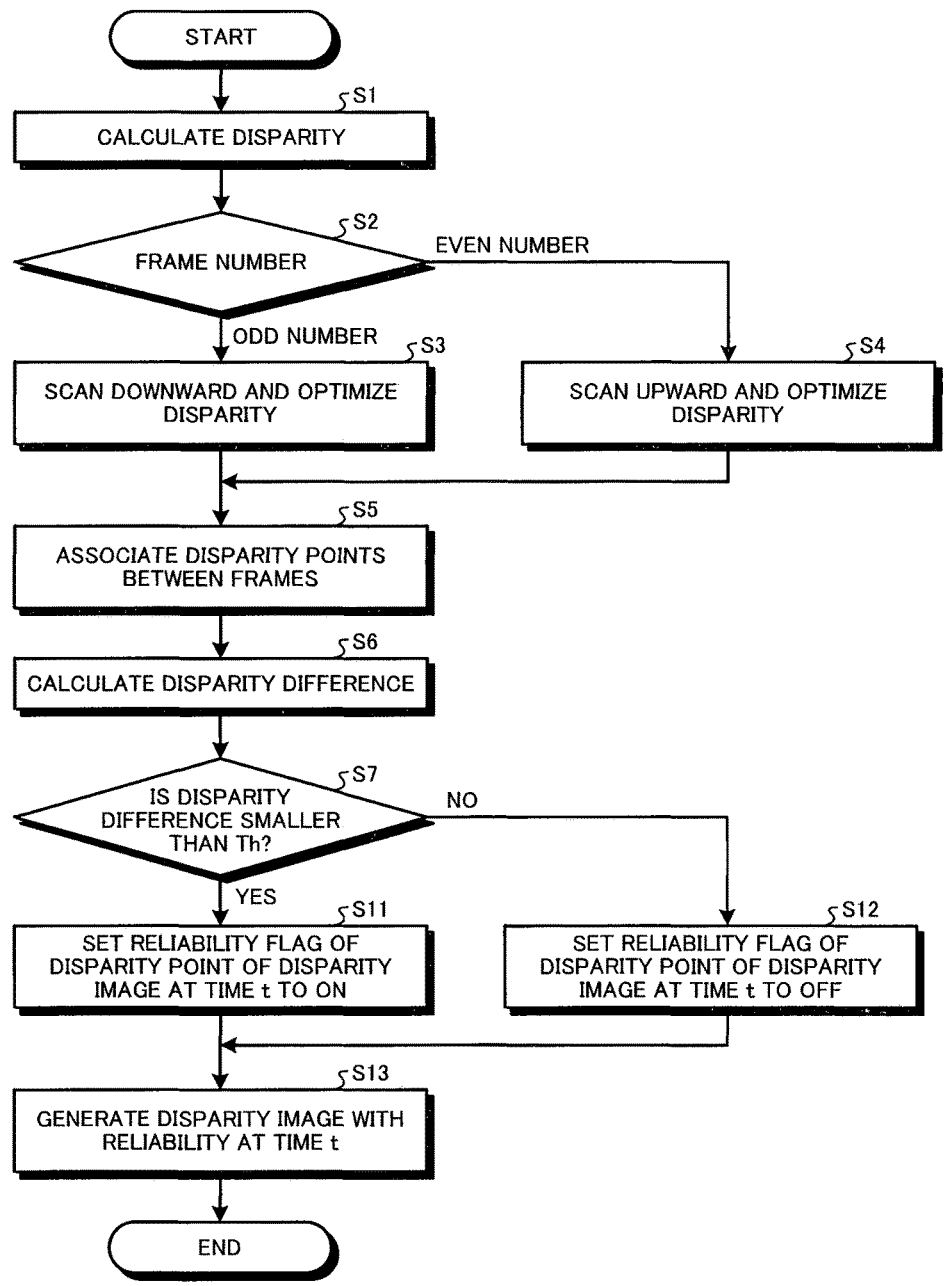
FIG. 17 is a flowchart illustrating another exemplary basic processing of a disparity image generating device according to the present invention.

FIG. 16 has been described in connection with the example in which the disparity value is removed when the difference between disparity values is greater than or equal to the determination threshold value Th, and the disparity value is held when the difference between disparity values is smaller than the determination threshold value Th, but in the present embodiment, when the difference between disparity values is greater than or equal to the determination threshold value Th, the reliability flag of the disparity value may be set to OFF, and when the difference between disparity values is smaller than the determination threshold value Th, the reliability flag of the disparity value may be set to ON. The process in this case will be described with reference to FIG. 17. FIG. 17 is a flowchart illustrating another exemplary basic processing of the disparity image generating device according to the present invention. FIG. 17 illustrates a processing flow when threshold value processing is performed on the disparity difference between associated disparity points of frames, and reliability is allocated.

As illustrated in FIG. 17, the ECU 3 searches for corresponding points between distortion-corrected brightness images of left and right cameras, and calculates a disparity image (step S1).

The ECU 3 determines whether a frame number corresponding to an imaging timing number of the disparity image calculated in step S1 is an odd number or an even number (step S2).

In step S2, for example, when the frame number is assumed to range from 1 to 10, odd numbered frames are 1, 3, 5, 7, and 9. Further, even numbered frames are 2, 4, 6, 8, and 10. In the process of FIG. 17, when the first time (t−1) is assumed to be the odd numbered frame 1, the second time (t) is the even numbered frame 2. Further, when the first time (t−1) is assumed to be the odd numbered frame 3, the second time (t) is the even numbered frame 4. Similarly, when the first time (t−1) is assumed to be the odd numbered frames 5, 7, and 9, the second time (t) are the even numbered frames 6, 8, and 10.

When the frame number is determined to be the odd number in step S2 (odd number in step S2), the ECU 3 performs the raster scan from an upper line to a lower line starting from a pixel at an upper left of an image when the frame number is the odd number as illustrated in FIG. 4, and optimizes a disparity (step S3). Thereafter, the process proceeds to step S5.

When the frame number is determined to be the even number in step S2 (even number in step S2), the ECU 3 performs the raster scan from a lower line to an upper line starting from a pixel at an lower right of an image when the frame number is the even number as illustrated in FIG. 5, and optimizes a disparity (step S4). Thereafter, the process proceeds to step S5.

After the optimization processes of step S3 and step S4, the ECU 3 associates disparity points between frames (step S5). Specifically, as illustrated in FIG. 12, for chronologically consecutive disparity images, the ECU 3 shifts points of the disparity image D(t−1) of an immediately previous frame by an own vehicle momentum, and associates the shifted points with points of the disparity image D(t) of a current frame present at the same position in image coordinates.

The ECU 3 calculates a disparity difference from the disparity images associated in step S5 (step S6). The ECU 3 determines whether or not the disparity difference calculated in step S6 is smaller than the determination threshold value Th for each pixel (step S7). When the disparity difference is determined to be smaller than the determination threshold value Th in step S7 (Yes in step S7), the ECU 3 sets the reliability flag of the disparity value to ON for the pixel (step S11). However, when the disparity difference is determined to be greater than or equal to the determination threshold value Th in step S7 (No in step S7), the ECU 3 sets the reliability flag of the disparity value to OFF for the pixel (step S12). The ECU 3 generates a disparity image with reliability for the time t based on the processing results of step S11 and step S12 (step S13). For example, in step S13, the ECU 3 generates the image illustrated in FIGS. 15($a$) to 15($d$). Thereafter, the present process ends.

As described above, according to the disparity image generating device and the disparity image generating method of the present embodiment, the disparity value optimization process is not performed using both the disparity image D(1) based on the brightness image L and the disparity image D'(1') based on the brightness image R as in the related art (Patent Literature 1 or the like), but the disparity value optimization process can be performed based on the first disparity image D(t−1) and the second disparity image D(t) calculated for imaging frames of different imaging times based on any one of the brightness image L and the brightness image R. As a result, it is possible to obtain the desired disparity image D2 using the brightness image based on any one of the brightness image L and the brightness image R after the same correction level as in the related art is maintained. Further, as a result, since the disparity image calculation process and the image processing subsequent thereto need not be performed based on both the brightness image L and the brightness image R, it is possible to suppress the processing cost to be lower than in the related art.

Further, according to the disparity image generating device and the disparity image generating method of the present embodiment, points of a disparity image D(t−1) of an immediately previous frame are shifted by an own vehicle momentum and then associated with a disparity image D(t) of a current frame present at the same position in image coordinates for chronologically consecutive disparity images, and thus even when the vehicle greatly performs motion (translation or turning) during a period of time from the first time (t−1) to the second time (t), and an imaging range of a pixel at the second time (t) greatly deviates from an imaging range of a pixel at the first time (t−1), it is possible to optimize and continue processing.

Figure 18:
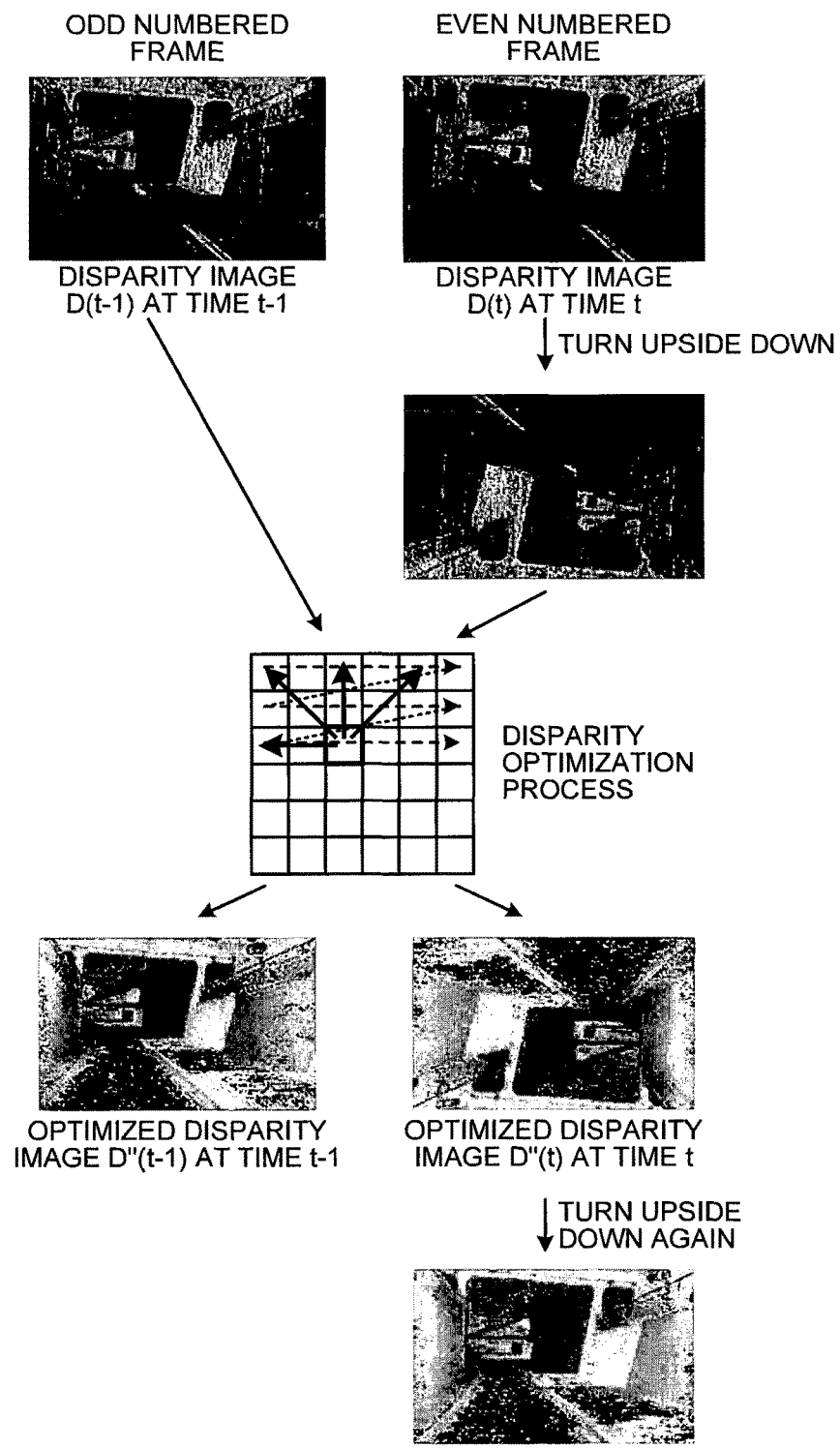
FIG. 18 is a diagram illustrating an exemplary upside-down turning process according to the present embodiment.
Figure 19:
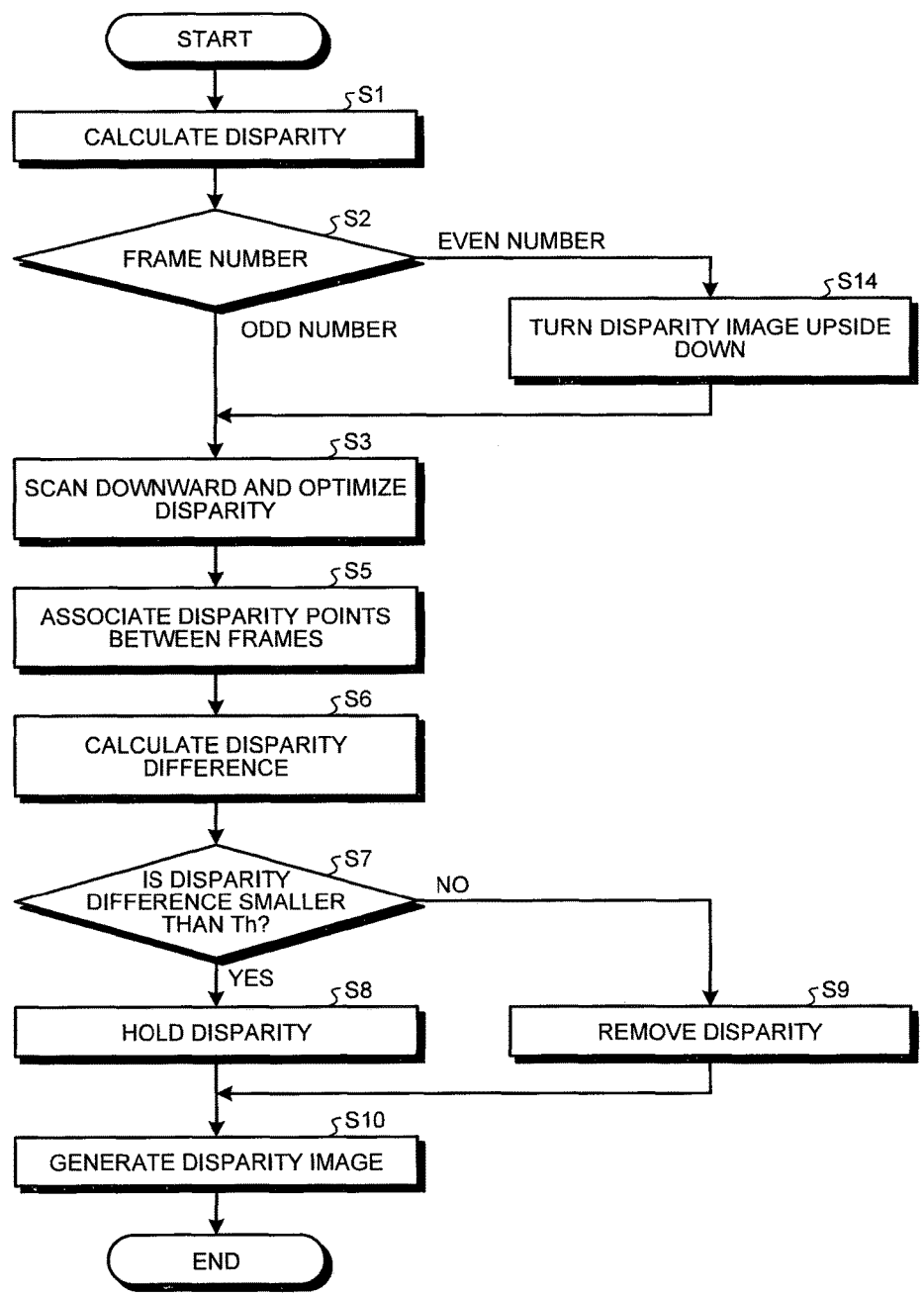
FIG. 19 is a flowchart illustrating another exemplary processing of a disparity image generating device according to the present invention.

In addition, in the present embodiment, the disparity image generating unit 3g may perform a process of turning the disparity image D upside down acquired by the disparity image acquiring unit 3b instead of switching the scanning direction of the optimization process in units of frames. For example, as illustrated in FIG. 18 that is a diagram illustrating an exemplary upside-down turning process according to the present embodiment, the disparity optimization process is performed on the disparity image D(t−1) of the odd numbered frame at the time t−1 without change, and the disparity image D(t) of the even numbered frame at the time t is turned upside down and then subjected to the same process as the disparity optimization process for the disparity image D(t−1) of the odd numbered frame at the time t−1. Then, an optimized disparity image D"(t−1) at the time t−1 after the disparity optimization process is performed is subjected to the inter-frame association process without change. Here, an optimized disparity image D"(t) at the time t after the disparity optimization process is performed is turned upside down again and then subjected to the inter-frame association process. As a result, since it is not necessary to prepare a processing logic for each scanning direction of the optimization process, it is possible to reduce the size of a circuit mounted in an in-vehicle microcomputer (ECU). Processing in this case will be described with reference to FIG. 19. FIG. 19 is a flowchart illustrating another exemplary processing of the disparity image generating device according to the present invention.

As illustrated in FIG. 19, the ECU 3 searches for corresponding points between distortion-corrected brightness images of left and right cameras, and calculates a disparity image (step S1).

The ECU 3 determines whether a frame number corresponding to an imaging timing number of the disparity image calculated in step S1 is an odd number or an even number (step S2).

In step S2, for example, when the frame number is assumed to range from 1 to 10, odd numbered frames are 1, 3, 5, 7, and 9. Further, even numbered frames are 2, 4, 6, 8, and 10. In the process of FIG. 19, when the first time (t−1) is assumed to be the odd numbered frame 1, the second time (t) is the even numbered frame 2. Further, when the first time (t−1) is assumed to be the odd numbered frame 3, the second time (t) is the even numbered frame 4. Similarly, when the first time (t−1) is assumed to be the odd numbered frames 5, 7, and 9, the second time (t) are the even numbered frames 6, 8, and 10.

When the frame number is determined to be the odd number in step S2 (odd number in step S2), the ECU 3 performs the raster scan from an upper line to a lower line starting from a pixel at an upper left of an image as illustrated in FIG. 4, and optimizes a disparity (step S3). Thereafter, the process proceeds to step S5.

When the frame number is determined to be the even number in step S2 (even number in step S2), the ECU 3 turns the disparity image of the even numbered frame upside down as illustrated in FIG. 18 (step S14). Thereafter, the process proceeds to step S3, and the upside-down turned disparity image is raster-scanned from the upper line to the lower line starting from the pixel at the upper left of the image, similarly to the odd numbered frame as illustrated in FIG. 4, and the disparity is optimized. The optimized disparity image of the even numbered frame is turned upside down again before the process proceeds to step S5. Thereafter, the process proceeds to step S5.

After the optimization processes of step S3, the ECU 3 associates the disparity points between frames (step S5). Specifically, as illustrated in FIG. 12, for chronologically consecutive disparity images, the ECU 3 shifts points of the disparity image D(t−1) of an immediately previous frame by an own vehicle momentum, and associates the shifted points with points of the disparity image D(t) of a current frame present at the same position in image coordinates.

The ECU 3 calculates a disparity difference from the disparity images associated in step S5 (step S6). The ECU 3 determines whether or not the disparity difference calculated in step S6 is smaller than the determination threshold value Th for each pixel (step S7). When the disparity difference is determined to be smaller than the determination threshold value Th in step S7 (Yes in step S7), the ECU 3 holds the disparity value for the pixel (step S8). However, when the disparity difference is determined to be greater than or equal to the determination threshold value Th in step S7 (No in step S7), the ECU 3 removes the disparity value for the pixel (step S9). The ECU 3 generates a disparity image based on the processing results of step S8 and step S9 (step S10). For example, in step S10, the ECU 3 generates the image illustrated in FIGS. 15(*a*) to 15(*d*). Thereafter, the present process ends.

The above embodiment has been described in connection with the example in which the first time (t−1) is assumed to be 1, 3, 5, 7, and 9 corresponding to the odd numbered frames, and the second time (t) is assumed to be 2, 4, 6, 8, and 10 corresponding to the even numbered frames, but the present invention is not limited to this example. The second time (t) is preferably a time after the first time (t−1) and may be set at certain intervals. For example, when a certain interval is set to 3 frames, the first time (t) may be 1, 4, and 7, and the second time (t−1) may be 2, 5, and 8.

REFERENCE SIGNS LIST

1 imaging device
  1*a* right camera
  1*b* left camera
2 vehicle momentum detecting device
  2*a* vehicle speed sensor
  2*b* yaw rate sensor
  2*c* acceleration sensor
3 ECU
  3*a* brightness image acquiring unit
  3*b* disparity image acquiring unit
  3*c* first correcting unit
  3*d* second correcting unit
  3*e* vehicle information acquiring unit
  3*f* associating unit
  3*g* disparity image generating unit
  3*h* object detecting unit
  3*i* vehicle control unit
4 actuator

The invention claimed is:
1. A disparity image generating device comprising:
a disparity image acquiring unit configured to acquire chronologically consecutive first and second disparity images based on an imaging result of an environment around a vehicle, the first disparity image being a disparity image acquired by the disparity image acquiring unit at a first time, the second disparity image being a disparity image acquired by the disparity image acquiring unit at a second time which is a time after the first time;

a first correcting unit configured to optimize a disparity value of a first target pixel from among pixels configuring the first disparity image using semi-global matching, based on a disparity value of a pixel configuring at least a part of a first pixel route which is in a first pixel region configured with a plurality of pixels around the first target pixel, the first pixel route being a pixel route in at least one direction from the first target pixel toward the first pixel region;

a second correcting unit configured to optimize a disparity value of a second target pixel from among pixels configuring the second disparity image using the semi-global matching, based on a disparity value of a pixel configuring at least a part of a second pixel route which is in a second pixel region configured with a plurality of pixels around the second target pixel, the second pixel route being a pixel route in at least one direction from the second target pixel toward the second pixel region, the second pixel route being a pixel route in a direction approximately opposite to a direction of the first pixel route, the second target pixel being positioned at a position corresponding to the first target pixel; and a disparity image generating unit configured to calculate a desired disparity image, based on a comparison between the first disparity image optimized by the first correcting unit and the second disparity image optimized by the second correcting unit.

2. The disparity image generating device according to claim 1, further comprising:

a vehicle information acquiring unit configured to acquire movement information of the vehicle; and an associating unit configured to associate a certain pixel position configuring the first disparity image with a certain pixel position configuring the second disparity image so that the certain pixel positions become a same imaging position, based on movement information from the first time to the second time acquired by the vehicle information acquiring unit, wherein the disparity image generating unit compares the first disparity image optimized by the first correcting unit with the second disparity image optimized by the second correcting unit for each pixel between pixels associated by the associating unit, to calculate the desired disparity image.

3. The disparity image generating device according to claim 2, wherein at the time the desired disparity image is calculated, by comparing a difference between the disparity value of the first disparity image optimized by the first correcting unit and the disparity value of the second disparity image optimized by the second correcting unit for each pixel, the disparity image generating unit suppresses a disparity value of the second target pixel in the second disparity image from being used as a disparity value of the desired disparity image, at the time the difference between the disparity values is greater than or equal to a certain determination threshold value, and the disparity image generating unit promotes the disparity value of the second target pixel in the second disparity image to be used as the disparity value of the desired disparity image, at the time the difference between the disparity values is smaller than the determination threshold value.

4. The disparity image generating device according to claim 3, wherein the disparity image generating unit does not use the disparity value of the second target pixel in the second disparity image as the disparity value of the desired disparity image, at the time the difference between the disparity values is greater than or equal to the determination threshold value, and the disparity image generating unit uses the disparity value of the second target pixel in the second disparity image as the disparity value of the desired disparity image, at the time the difference between the disparity values is smaller than the determination threshold value.

5. The disparity image generating device according to claim 4, wherein the certain determination threshold value is a determination threshold value decided according to a disparity value with reference to a map specified such that a threshold value increases as a disparity value increases, or a determination threshold value set as a fixed value in advance.

6. The disparity image generating device according to claim 3, wherein the disparity image generating unit sets the disparity value of the second target pixel in the second disparity image to the desired disparity image as a disparity value with low reliability, at the time the difference between the disparity values is greater than or equal to the determination threshold value, and the disparity image generating unit sets the disparity value of the second target pixel in the second disparity image to the desired disparity image as a disparity value with high reliability, at the time the difference between the disparity values is smaller than the determination threshold value.

7. The disparity image generating device according to claim 6, wherein the certain determination threshold value is a determination threshold value decided according to a disparity value with reference to a map specified such that a threshold value increases as a disparity value increases, or a determination threshold value set as a fixed value in advance.

8. The disparity image generating device according to claim 3, wherein the certain determination threshold value is a determination threshold value decided according to a disparity value with reference to a map specified such that a threshold value increases as a disparity value increases, or a determination threshold value set as a fixed value in advance.

9. The disparity image generating device according to claim 1, wherein at the time the desired disparity image is calculated, by comparing a difference between the disparity value of the first disparity image optimized by the first correcting unit and the disparity value of the second disparity image optimized by the second correcting unit for each pixel, the disparity image generating unit suppresses a disparity value of the second target pixel in the second disparity image from being used as a disparity value of the desired disparity image, at the time the difference between the disparity values is greater than or equal to a certain determination threshold value, and the disparity image generating unit promotes the disparity value of the second target pixel in the second disparity image to be used as the disparity value of the desired disparity image, at the time the difference between the disparity values is smaller than the determination threshold value.

10. The disparity image generating device according to claim 9, wherein the disparity image generating unit does not use the disparity value of the second target pixel in the second disparity image as the disparity value of the desired disparity image, at the time the difference between the disparity values is greater than or equal to the determination threshold value, and the disparity image generating unit uses the disparity value of the second target pixel in the second disparity image as the disparity value of the desired disparity image, at the time the difference between the disparity values is smaller than the determination threshold value.

11. The disparity image generating device according to claim 10, wherein the certain determination threshold value is a determination threshold value decided according to a disparity value with reference to a map specified such that a threshold value increases as a disparity value increases, or a determination threshold value set as a fixed value in advance.

12. The disparity image generating device according to claim 9, wherein the disparity image generating unit sets the disparity value of the second target pixel in the second disparity image to the desired disparity image as a disparity value with low reliability, at the time the difference between the disparity values is greater than or equal to the determination threshold value, and the disparity image generating unit sets the disparity value of the second target pixel in the second disparity image to the desired disparity image as a disparity value with high reliability, at the time the difference between the disparity values is smaller than the determination threshold value.

13. The disparity image generating device according to claim 12, wherein the certain determination threshold value is a determination threshold value decided according to a disparity value with reference to a map specified such that a threshold value increases as a disparity value increases, or a determination threshold value set as a fixed value in advance.

14. The disparity image generating device according to claim 9, wherein the certain determination threshold value is a determination threshold value decided according to a disparity value with reference to a map specified such that a threshold value increases as a disparity value increases, or a determination threshold value set as a fixed value in advance.

15. A disparity image generating method comprising:

a disparity image acquiring step of acquiring chronologically consecutive first and second disparity images based on an imaging result of an environment around a vehicle, the first disparity image being a disparity image acquired by the disparity image acquiring step at a first time, the second disparity image being a disparity image acquired by the disparity image acquiring step at a second time which is a time after the first time;

a first correcting step of optimizing a disparity value of a first target pixel from among pixels configuring the first disparity image using semi-global matching, based on a disparity value of a pixel configuring at least a part of a first pixel route which is in a first pixel region configured with a plurality of pixels around the first target pixel, the first pixel route being a pixel route in at least one direction from the first target pixel toward the first pixel region;

a second correcting step of optimizing a disparity value of a second target pixel from among pixels configuring the second disparity image using the semi-global matching, based on a disparity value of a pixel configuring at least a part of a second pixel route which is in a second pixel region configured with a plurality of pixels around the second target pixel, the second pixel route being a pixel route in at least one direction from the second target pixel toward the second pixel region, the second pixel route being a pixel route in a direction approximately opposite to a direction of the first pixel route, the second target pixel being positioned at a position corresponding to the first target pixel; and a disparity image generating step of calculating a desired disparity image, based on a comparison between the first disparity image optimized in the first correcting step and the second disparity image optimized in the second correcting step.

16. The disparity image generating method according to claim 15, further comprising:

a vehicle information acquiring step of acquiring movement information of the vehicle; and an associating step of associating a certain pixel position configuring the first disparity image with a certain pixel position configuring the second disparity image so that the certain pixel positions become a same imaging position, based on movement information from the first time to the second time acquired in the vehicle information acquiring step, wherein the disparity image generating step includes comparing the first disparity image optimized in the first correcting step with the second disparity image optimized in the second correcting step for each pixel between pixels associated in the associating step, to calculate the desired disparity image.

17. The disparity image generating method according to claim 16, wherein at the time the desired disparity image is calculated, by comparing a difference between the disparity value of the first disparity image optimized in the first correcting step and the disparity value of the second disparity image optimized in the second correcting step for each pixel, the disparity image generating step includes suppressing a disparity value of the second target pixel in the second disparity image from being used as a disparity value of the desired disparity image, at the time the difference between the disparity values is greater than or equal to a certain determination threshold value, and the disparity image generating step includes promoting the disparity value of the second target pixel in the second disparity image to be used as the disparity value of the desired disparity image, at the time the difference between the disparity values is smaller than the determination threshold value.

18. The disparity image generating method according to claim 15,
wherein at the time the desired disparity image is calculated, by comparing a difference between the disparity value of the first disparity image optimized in the first correcting step and the disparity value of the second disparity image optimized in the second correcting step for each pixel,
the disparity image generating step includes suppressing a disparity value of the second target pixel in the second disparity image from being used as a disparity value of the desired disparity image, at the time the difference between the disparity values is greater than or equal to a certain determination threshold value, and
the disparity image generating step includes promoting the disparity value of the second target pixel in the second disparity image to be used as the disparity value of the desired disparity image, at the time the difference between the disparity values is smaller than the determination threshold value.

19. A non-transitory computer-readable medium storing instructions therein that, when executed by a processor, perform a disparity image generating method, the disparity image generating method including:
a disparity image acquiring step of acquiring chronologically consecutive first and second disparity images based on an imaging result of an environment around a vehicle, the first disparity image being a disparity image acquired by the disparity image acquiring step at a first time, the second disparity image being a disparity image acquired by the disparity image acquiring step at a second time which is a time after the first time,
a first correcting step of optimizing a disparity value of a first target pixel from among pixels configuring the first disparity image using semi-global matching, based on a disparity value of a pixel configuring at least a part of a first pixel route which is in a first pixel region configured with a plurality of pixels around the first target pixel, the first pixel route being a pixel route in at least one direction from the first target pixel toward the first pixel region,
a second correcting step of optimizing a disparity value of a second target pixel from among pixels configuring the second disparity image using the semi-global matching, based on a disparity value of a pixel configuring at least a part of a second pixel route which is in a second pixel region configured with a plurality of pixels around the second target pixel, the second pixel route being a pixel route in at least one direction from the second target pixel toward the second pixel region, the second pixel route being a pixel route in a direction approximately opposite to a direction of the first pixel route, the second target pixel being positioned at a position corresponding to the first target pixel, and
a disparity image generating step of calculating a desired disparity image, based on a comparison between the first disparity image optimized in the first correcting step and the second disparity image optimized in the second correcting step,
wherein the image is configured with only pixels having disparity values of the second disparity image in which a difference between a disparity value of the first disparity image optimized in the first correcting step and a disparity value of the second disparity image optimized in the second correcting step is determined to be smaller than a determination threshold value in the disparity image generating step.

\* \* \* \* \*